(12) United States Patent
Smith

(10) Patent No.: US 7,251,347 B2
(45) Date of Patent: Jul. 31, 2007

(54) SYSTEM AND METHOD FOR AUTHENTICATION OF A WORKPIECE USING THREE DIMENSIONAL SHAPE RECOVERY

(75) Inventor: Joshua R. Smith, Cambridge, MA (US)

(73) Assignee: The Escher Group, Ltd., Cambridge, MA (US)

( * ) Notice: Subject to any disclaimer, the term of this patent is extended or adjusted under 35 U.S.C. 154(b) by 861 days.

(21) Appl. No.: 10/410,487

(22) Filed: Apr. 9, 2003

(65) Prior Publication Data

US 2003/0219145 A1    Nov. 27, 2003

Related U.S. Application Data

(60) Provisional application No. 60/371,073, filed on Apr. 9, 2002.

(51) Int. Cl.
*G06K 9/00* (2006.01)
(52) U.S. Cl. ........................... 382/108; 340/5.8
(58) Field of Classification Search ............ 382/100, 382/108, 135, 154; 356/71; 340/5.8, 5.86; 283/72, 74, 79, 81
See application file for complete search history.

(56) References Cited

U.S. PATENT DOCUMENTS

| | | | | |
|---|---|---|---|---|
| 5,180,192 A | | 1/1993 | Herbert | 283/101 |
| 5,325,167 A | * | 6/1994 | Melen | 356/71 |
| 5,850,306 A | | 12/1998 | Fukutome et al. | 359/204 |
| 5,974,150 A | * | 10/1999 | Kaish et al. | 380/25 |
| 6,292,582 B1 | | 9/2001 | Lin et al. | 382/149 |
| 6,321,988 B1 | | 11/2001 | Merchant et al. | 235/462.12 |
| 6,517,004 B2 | | 2/2003 | Good et al. | 235/472.02 |
| 6,584,214 B1 | * | 6/2003 | Pappu et al. | 382/108 |
| 6,611,599 B2 | | 8/2003 | Nataranjan | 380/203 |
| 2003/0035147 A1 | * | 2/2003 | Patton et al. | 358/3.28 |

FOREIGN PATENT DOCUMENTS

| | | |
|---|---|---|
| EP | 0878778 A2 | 11/1998 |
| WO | WO 97/24699 A1 | 7/1997 |
| WO | WO 00/65541 A1 * | 11/2000 |

\* cited by examiner

*Primary Examiner*—Andrew W. Johns
(74) *Attorney, Agent, or Firm*—Cesari and McKenna, LLP

(57) ABSTRACT

A workpiece authentication system uses shape recovery techniques to extract explicit three dimensional ("3-D") features of the surface geometry of the designated portion of a workpiece from images produced using different lighting conditions. The system then bases authentication on the 3-D surface features. The system recovers surface normals, or equivalently gradients, for selected locations within a designated portion of the workpiece from multiple enrollment images produced under different illumination conditions. The system then encodes the surface normal information into authentication indicia that is placed on the workpiece and/or stores the surface normals or related information. Thereafter, the system determines that a given workpiece is authentic if the surface normals recovered from various verification images correspond to the stored surface normal information or the surface normal information encoded into the indicia. Alternatively, the system may use the surface normals to predict what an image should contain when the workpiece is subjected to a particular lighting condition. The system then determines that the workpiece is authentic if the predicted image and the image produced using the workpiece correspond. The system may instead encode brightness patterns associated with one or more enrollment images into the indicia. The system then recovers surface normals from images produced during verification operations, predicts what the brightness image should contain and compares the enrollment image to the prediction.

62 Claims, 9 Drawing Sheets

SYSTEM AND METHOD FOR AUTHENTICATION OF A WORKPIECE USING THREE DIMENSIONAL SHAPE RECOVERY

CROSS-REFERENCE TO RELATED APPLICATIONS

This application claims priority from U.S. Provisional Patent Application Ser. No. 60/371,073 filed Apr. 9, 2002 entitled AUTHENTICATION USING SHAPE RECOVERY OF 3D SURFACE FEATURES, which is incorporated herein by reference.

This application is related to co-pending U.S. patent application Ser. No. 09/719,430 filed Dec. 12, 2000, entitled WORKPIECE AUTHENTICATION BASED UPON ONE OR MORE WORKPIECE IMAGES. This application and the related application have a common assignee and the related application is incorporated herein by reference.

BACKGROUND OF THE INVENTION

1. Field of the Invention

The present invention relates generally to workpiece authentication techniques, and more specifically, to such techniques which involve imaging one or more portions of the workpiece to generate abstractions (e.g., numeric or alphanumeric strings) which represent random physical characteristics of the surface geometry of the workpiece and/or an optically active medium included on or embedded in the workpiece, and using the abstractions to determine whether the workpiece is authentic.

2. Brief Description of Related Prior Art

A value indicium is a symbol or token that indicates payment for a service. One example of a commonly-used value indicium is the "franking" or postal meter mark, which is placed on a postal mailpiece to indicate that a specified amount of money has been paid to post the mailpiece. Other examples of value indicia include paper currency, money orders, and tickets for cultural events and transportation.

Authentication indicia are symbols or tokens placed on or in a workpiece for use in determining the validity of the workpiece (e.g., whether the workpiece is authentic, as opposed to being a forgery). For example, legal documents, such as passports and driver's licenses often have authentication indicia in the form of validation stamps/seals from a certifying authority (CA), such as the government, placed on them that vouch for the authenticity of the legal documents.

In the past, if a postal franking mark on a postal mailpiece appeared to the ordinary observer (e.g., a postal clerk) to have been made by an authorized postal franking device, the mailpiece would be considered valid and would be posted without further inquiry into whether the mark was genuine. Unfortunately, improvements in photo-copying, computer-based imaging and duplication technologies have rendered this prior art authentication technique unreliable, as they have permitted the unscrupulous to produce high quality forgeries of such franking marks that often appear genuine to the ordinary observer. This has driven interest in creating a postal franking mark whose authenticity can be determined without reference to its appearance, but instead can be determined using different criteria.

In one such conventional validation technique, the franking mark comprises an indicium that contains certain identifying information, such as the postage purchase date, meter identification number, franking sequence number, source and destination addresses of the mailpiece, and a cryptographic signature of the identifying information. According to this technique, mailpiece forgeries are detected based upon whether differences exist between the identifying information and the cryptographic signature in the indicium, and the actual identifying information of the mailpiece and the actual cryptographic signature of such actual identifying information.

Unfortunately, this latter validation technique is unable to thwart certain types of postal franking fraud. For example, if the identifying information and signature of a valid indicium of a first mailpiece are also valid for a second mailpiece, then the indicium of the first mailpiece may be fraudulently copied onto the second mail piece, and the fraudulent copying cannot be detected using this technique. Hereinafter, this type of fraud will be termed "double spending fraud."

Additionally, advances in networking technology have also permitted wide access to the data underlying such franking marks. For example, one could download such data using the Internet from a computer node storing such data (e.g., via email or a World Wide Web posting), and depending upon the manner in which this conventional technique is implemented, a large number of seemingly valid franking marks could be generated based upon such data. This further exacerbates the possibility and opportunity for such fraud.

In one prior art technique that is used to try to thwart double spending fraud, a database tracks use of value indicia and the respective identifying information therein. If two mailpieces have identical indicia, the database indicates this as a possible occurrence of double spending fraud.

Unfortunately, in practical implementation, this conventional double spending fraud detection technique requires use of a large database to track the indicia's identifying information. Disadvantageously, the burden and expense of maintaining and querying such a large database is undesirable. Also disadvantageously, this conventional fraud detection technique does not permit off-line verification of the indicia (i.e., not based upon information obtained via a network), and no mechanism is provided in this technique to determine which indicium among indicia determined to be identical is authentic.

Another prior art fraud problem arises when unauthorized use is made of data or digital tokens (e.g., stored in a computerized postal franking system's internal memory) that when supplied to the system cause it to produce otherwise valid authentication indicia.

One solution to the problems discussed above is to produce an authentication indicium that corresponds to a string that is based upon, at least in part, intrinsic physical characteristics of a designated portion of the workpiece. The physical characteristics include one or more images of surface topographical appearance produced by illuminating the designated portion of the workpiece. A system and method for producing such authentication indicia is discussed in U.S. patent application Ser. No. 09/719,430 filed Dec. 12, 2000 entitled WORKPIECE AUTHENTICATION BASED UPON ONE OR MORE WORKPIECE IMAGES, which is incorporated herein by reference. Basically, a reader illuminates the designated portion of the workpiece, to produce one or more images that consist of patterns that are the result of light that is reflected by features of the surface geometry of the designated portion of the workpiece. The images are sometimes referred to herein as "enrollment images." The reader then produces a signal that corresponds to the enrollment images, and incorporates the signal into the string on which the authentication indicium is based. The signal may correspond to the appearance of the surface features, i.e., a two dimensional representation, or when different lighting conditions are used for the various enrollment images, to implicitly defined three dimensional surface features.

To verify the authenticity of the workpiece, the system thereafter illuminates the designated portion and produces one or more new images, which are sometimes referred to herein as "verification images." The system may then generate a corresponding string and/or indicium and compare the result with the string and/or indicium that is associated with the workpiece. Alternatively, the system may compare the verification images with the enrollment images, which may be reproduced from the information contained in the indicium.

When the enrollment images are produced the workpiece is in a particular position with respect to the illumination sources and the camera that are included in the reader. The arrangement of the workpiece, illumination sources and camera is referred to hereinafter as the "enrollment geometry," and the images necessarily depend on the particular enrollment geometry.

The workpiece includes registration information, such as an arrangement or constellation of dots in predetermined locations on the workpiece. Using the registration information, the system determines that the workpiece is in the desired position with respect to the components of the reader during the enrollment operations.

During verification operations, the system must also ensure that the verification images are produced using a "verification geometry" that is essentially the same as the enrollment geometry. The system may thus use the registration information included on the workpiece to mechanically reposition the workpiece such that the verification geometry is physically the same as the enrollment geometry. Alternatively, the system may use the registration information to determine coordinate axes in the images and/or which pixels to sample and thus computationally match the verification geometry to the enrollment geometry essentially, as long as the workpiece is in a relatively similar position and/or orientation.

The two authentication systems discussed above work well to correctly identify as genuine or counterfeit a workpiece that is in a position that is sufficiently close to reproduce the enrollment geometry. The relatively strict registration requirement may, however, limit the types of readers that can be used and/or present an obstacle to an inexperienced user. For example, if a stationary reader, similar to a bar code reader, is used, the user must not only place the workpiece in the proper orientation and position, the user must also ensure that surface of the designated portion of the workpiece is parallel to the reader. As discussed above, the workpiece may be the paper on which a document, a postal franking mark or currency is printed, a label that is secured to an object after the indicia is printed thereon, or an object, and thus, the re-positioning of the workpiece to match the enrollment geometry relative to, for example, a handheld reader or even a stationary stand-alone reader may be time consuming and/or frustrating. Thus, a system that relaxes the verification registration requirement is desired.

SUMMARY OF THE INVENTION

A workpiece authentication system uses shape recovery techniques to extract explicit three dimensional ("3-D") features of the surface geometry of the designated portion of a workpiece from images produced using different lighting conditions. The system then bases authentication on the 3-D surface features. The system can thus operate within a wider range of enrollment and/or verification geometries. For example, the system can accommodate verification geometries that differ from the associated enrollment geometries and/or arrangements in which the workpiece surface is not parallel to the camera's imaging plane. In addition, the system can combine estimates of the 3-D surface features made with images that are associated with different verification geometries, such as, for example, images made while the reader is moving closer to the workpiece.

The system recovers surface normals for selected locations within a designated portion of the workpiece from multiple enrollment images produced under different illumination conditions. The system then encodes the surface normal information into the authentication indicia. Thereafter, the system determines that a given workpiece is authentic if the surface normals recovered from various verification images correspond to the surface normal information encoded into the indicia. Alternatively, the system may use the surface normals to predict what an image should contain when the workpiece is subjected to a particular lighting condition. The system then determines that the workpiece is authentic if the predicted image and the image produced using the workpiece correspond. The system may instead encode a brightness pattern into the indicium, and thereafter recover surface normals from the verification images produced during verification operations. The system then uses the surface normals to predict what the enrollment image should contain, and compares the enrollment image to the prediction.

By recovering the surface normals, which are constant throughout all measurements, the system can combine multiple images to create a single 3-D estimate of the surface geometry, even if the enrollment or verification geometry is different for each of the images. For example, as a hand-held reader is brought closer to the workpiece, multiple estimates of the three dimensional features can be made and combined even though the illumination conditions change as the relative position and orientation of the workpiece shifts.

The system may also determine the albedo of the workpiece at the various locations from which authentication information is obtained. The system can then distinguish in the images between the 3-D surface features and changes in the coloration of the surface, such as those caused by the smudging of print over the surface.

These and other features and advantages of the present invention will become apparent as the following Detailed Description proceeds and upon reference to the Drawings, in which:

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
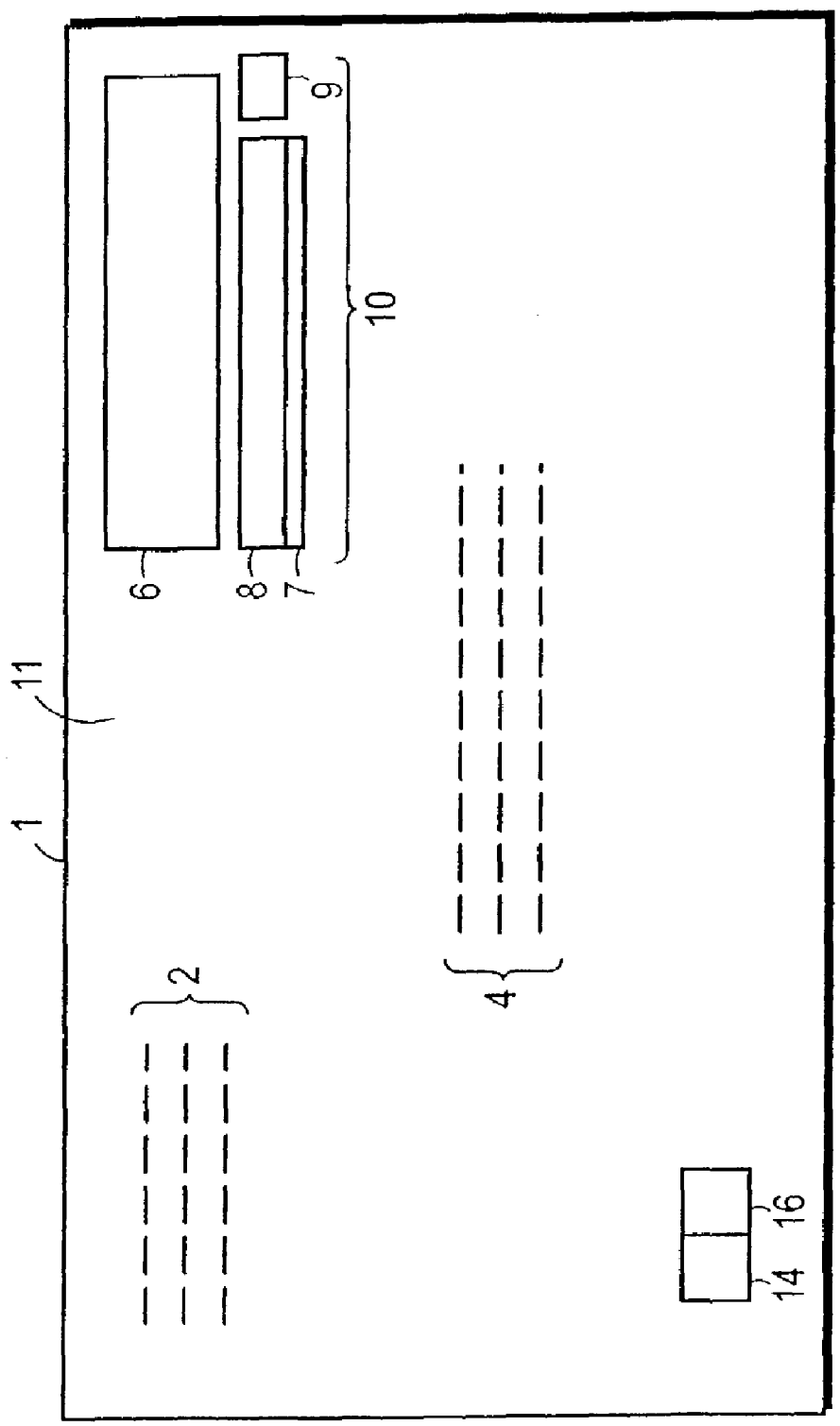
FIG. 1 is a highly schematic representation of the layout and elements comprised in a front surface of a mailpiece having one embodiment of an indicium in accordance with the first aspect of the present invention.
Figure 2:
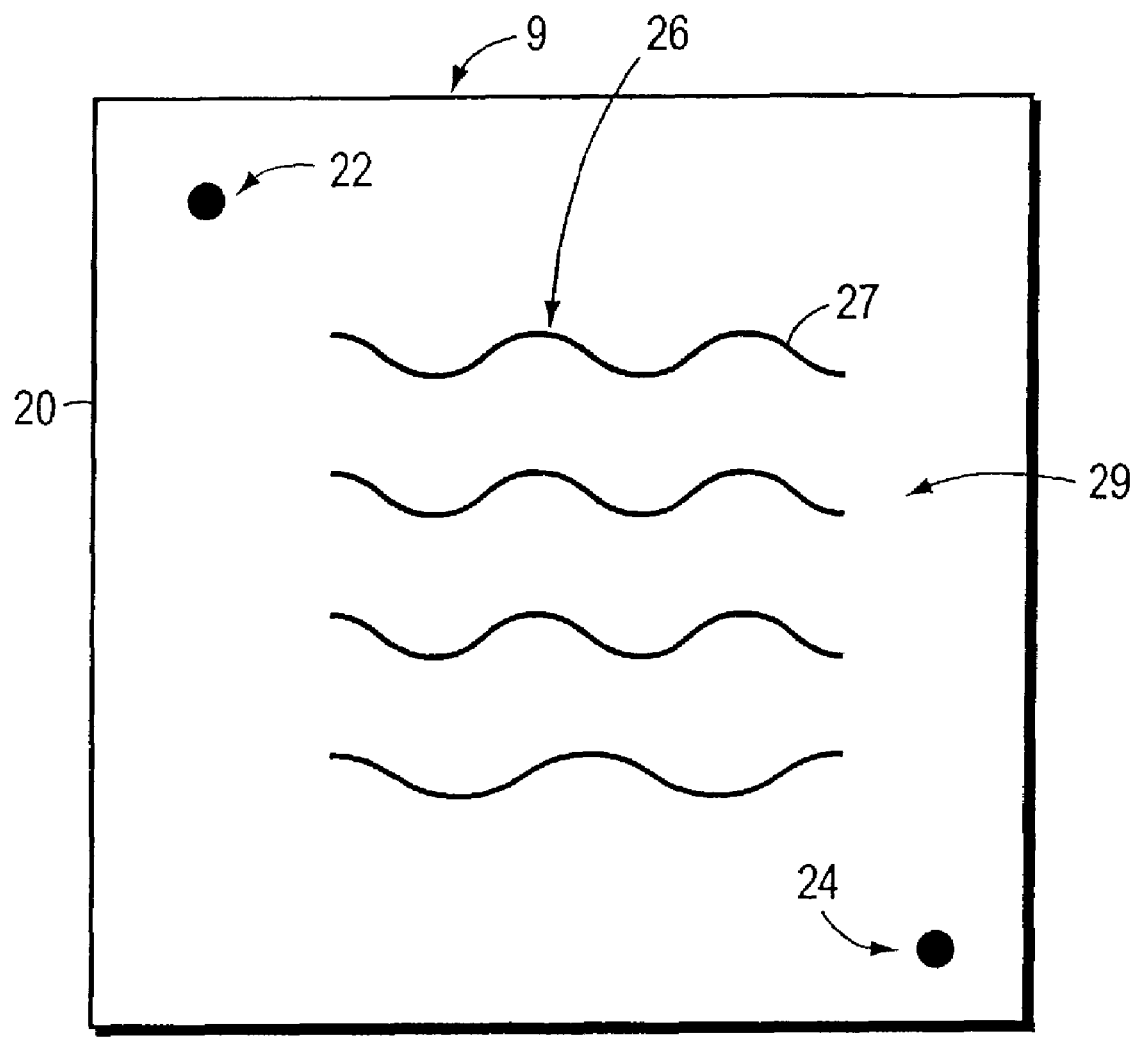
FIG. 2 is a highly schematic representation of a portion of the mailpiece of FIG. 1.

FIGS. 1-2 illustrate features of a workpiece 1 that includes one embodiment of an authentication indicium 10 made according to one aspect of the present invention. More specifically, in FIGS. 1-2, workpiece 1 is a postal mailpiece that comprises a postal envelope whose front outer surface 11 includes indicium 10. Surface 111 also comprises written postal source address 2 (i.e., of the sender of mailpiece 1) and destination address 4 (i.e., of the intended recipient of mailpiece 1) in the upper left corner and center, respectively, of the surface 11 of mailpiece envelope 1. A postal symbol or artistic graphic 6 may also be placed on the surface 11 (e.g., in the upper right corner of surface 11 above the indicium 10, as shown in FIG. 1).

In accordance with this embodiment of this aspect of the present invention, indicium 10 includes respective markings 7, 8 provided on surface 11 of the envelope 1. Markings 7 comprises a human-readable alphanumeric text disclosing to a human reader information that is pertinent to the mailpiece 1. The markings may include, for example, the amount of postage that has been paid to post the mailpiece 1 and the city and/or country from which the mailpiece 1 is being posted. Markings 8 are a human or machine readable uni- or multi-dimensional bar code and/or sequence of human-readable digits that correspond to or represent a "information security signature," and/or a numeric or alphanumeric string. The term "information security signature" refers to a code word that can be used to verify the validity of the workpiece. The use of markings 8 of indicia 10 in accordance with aspects of the present invention, to determine validity of the workpiece 1 is discussed in more detail below.

As shown in FIG. 2, markings 9 comprise a fiducial square or box 20 that encloses a portion 39 of workpiece 1 in which an optically active medium is included on the surface 11 or embedded in the workpiece. Two fiducial points or dots 22, 24 are located at diagonally-opposite corners of box 20. Each of the dots 22, 24 is spaced away from a respective corner of the box 20 by an identical distance.

Figure 3:
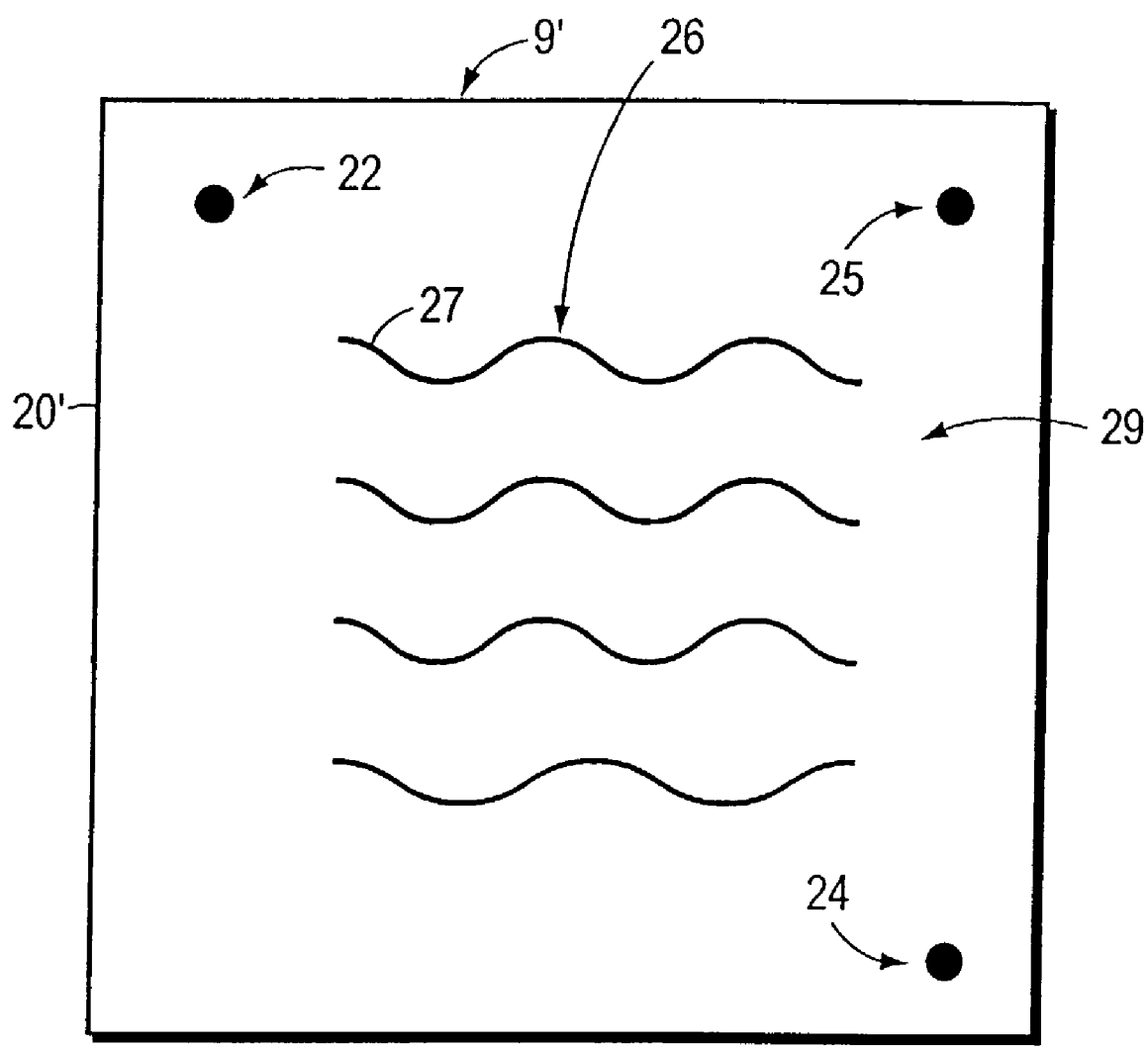
FIG. 3 is a highly schematic representation of a variation of the portion of the workpiece shown in FIG. 2.

Alternatively, as is shown in FIG. 3, marking 9 may be replaced with markings 9'. Markings 9' include a fiducial square or box 20' that encloses the portion 29 of the workpiece 1, and three fiducial dots 22, 24, 25. The dots 22, 24, 25 are respectively located adjacent respective corners of the box 20'. More specifically, each of the dots 22, 24, 25 is spaced away from a respective corner of the box 20' by an identical distance. Additionally, the distance between dots 22 and 25 is the same as the distance between dots 24 and 25, respectively.

Figure 5:
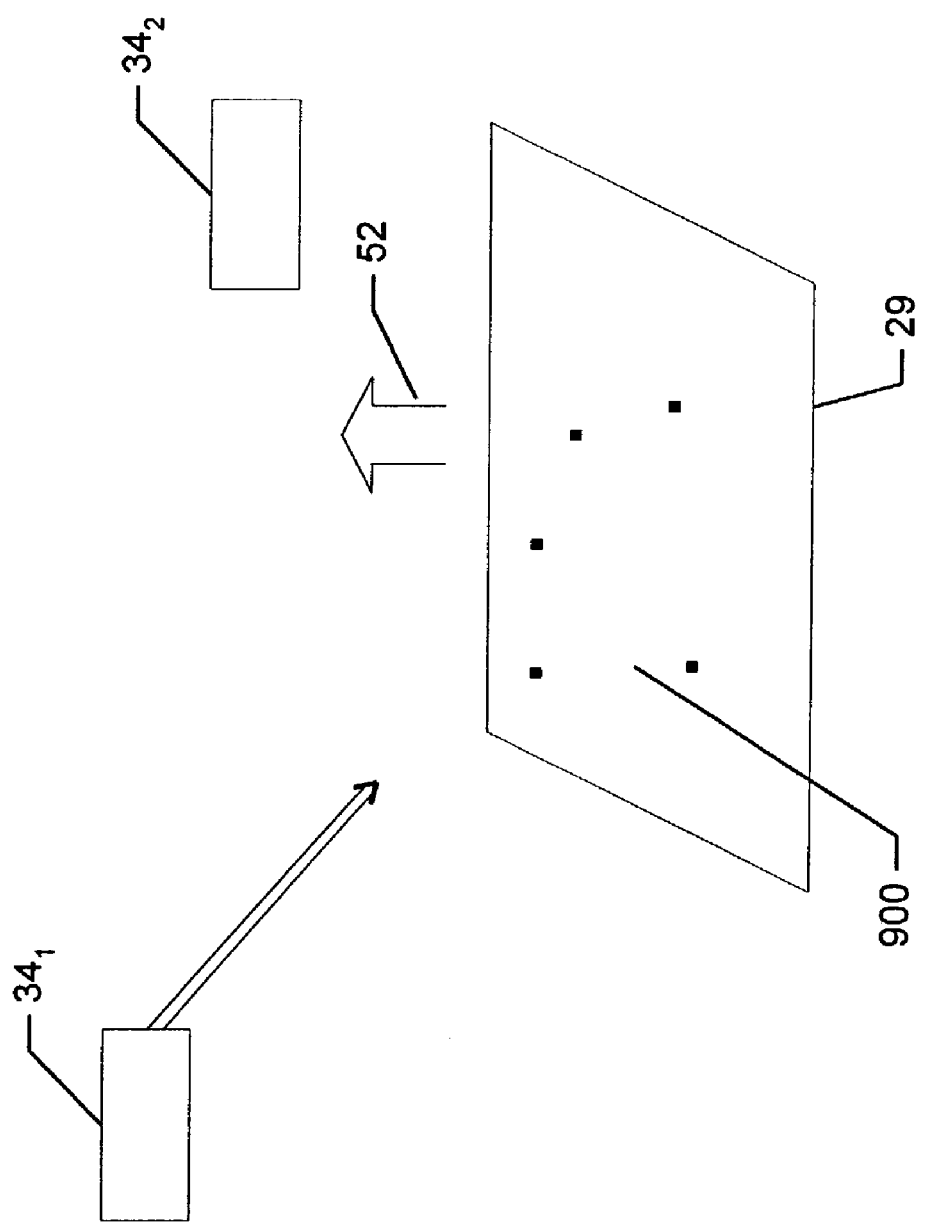
FIG. 5 is a functional block diagram illustrating positions of elements of the apparatus of FIG. 4 relative to the workpiece of FIG. 1 when the apparatus is in use.

The markings 9 or 9' may instead be in the form of a constellation 900 of dots 902 FIG. 5, that indicates the location and orientation of the portion 29, without forming a box or other enclosure around the portion.

As noted previously, markings 8 may correspond to or represent a unique "information security signature" and/or a numeric or alphanumeric string. The information security signature may be a signature that is produced by an asymmetric cryptographic technique, including encryption or digital signatures, such as, a cryptographic signature, which is the result of encrypting or signing the string using one cryptographic key of a private/public cryptographic key pair of a CA (e.g., a governmental authority, such as the U.S. Postal Service) in accordance with well known conventional private/public key encryption techniques. The information signature may instead be a signature that is produced by symmetric encryption of the string, or a signature that corresponds to a code word that is randomly assigned to the workpiece by, for example, the manufacturer. In addition, the string itself may be encrypted to add further protection. The use of the randomly assigned code word for validation of the workpiece is discussed in more detail below with reference to FIG. 5.

As will be described more fully below, if the mailpiece is valid/authentic, the string being represented by or corresponding to the markings 8 is based upon, at least in part, certain random 3-D features, (symbolically referred to by numeral 26) of the surface of the workpiece. The system determines the surface normals for selected 3-D features from respective images (referred to by numeral 47) that consist of patterns (referred to by numeral 27) that are the result of light that is reflected by the 3-D features of the surface geometry of the workpiece surface when the portion 29 is illuminated with electromagnetic radiation from one or a plurality of illumination positions or light sources. As will be described more fully below, the string represented by or corresponding to markings 8 is based upon or derived from the surface normals, which are in turn calculated from the respective images 47 that are associated with the portion 29. As used herein, the term "image" may include any combination of one- and/or two-dimensional samplings of reflected radiation from the surface 11.

The patterns 27 include details of certain readily observable or microscopic phenomena that are random and result from intrinsic three dimensional properties of the surface geometry of the portion 29. Such microscopic phenomena include craters, mountains and/or irregularities in the surface geometry which are determined based on the corresponding reflections.

Referring again to Figures, the string that is included in or associated with the markings 8 comprises a numerical hash value that is computed using a predetermined hashing algorithm, which operates upon numerical values that are representative of the images 47. Hashing algorithms are traditionally selected such that they generate identical respective hash values when supplied with identical respective groups of images 47. However, probabalistic algorithms may also be selected.

One example of a traditional hashing algorithm is the identity function. Thus, images 47 may be converted into respective sets of numerical values representing the surface normals or alternatively the associated brightness, the sets of numerical values may be concatenated with each other, and the value of the resulting concatenation may serve as the hash value. In practice, however, it will usually be desirable to employ a hashing algorithm that compresses (i.e., reduces the amount of data comprised in the sets of numerical values). For example, binary thresholded versions of the sets of numerical values may be concatenated to form the hash value, although typically much more compression will be desired. Alternatively, the sets of numerical values may be compressed with a lossy compression algorithm, such as JPEG or wavelet compression, and concatenated. Also alternatively, in practice, a small number of coefficients from discrete cosine transforms, discrete Fourier transforms, or wavelet transforms of the sets of numerical values may be used to form the hash value.

Further alternatively, the hash value may be generated using an algorithm that first extracts values associated with respective rectangular image portions or regions of predetermined size. The image regions may for example be 10 pixel rows by 200 pixel columns in size. The data associated with the respective image portions may then be scaled to a desired size, and undergo low pass filtering before the hash value is generated therefrom. The associated verification operations are then less sensitive to noise-related errors. This low pass filtering may comprise a transverse low pass filtering which is accomplished by averaging pixel illumination or associated surface normal values in respective columns along respective columns of the respective scaled images, and using the average pixel illumination or surface normal values generated as the corresponding values in a resulting transversely low pass filtered image.

More specifically, the respective average values are used as the respective values of pixels in the filtered image that correspond to the respective first values in the respective columns used to generate the average values. The averaged columns may each have the same size (e.g., 10 pixel values). Respective corresponding regions are then extracted from the transversely low pass filtered images (e.g., corresponding regions of 1 pixel by 100 pixels). These extracted regions then undergo a longitudinal high pass filtering. The high pass filtering may be accomplished by longitudinally low pass filtering the extracted regions and then subtracting corresponding values of the longitudinally low pass filtered images from the respective, original extracted regions from which they were generated. The resulting high pass filtered images may then undergo binary thresholding, and the respective numerical values generated therefrom may be concatenated to form the hash value.

In order to decrease the size of the resulting hash value, and increase the discriminatory power of each bit of the hash value a majority of the pixel locations comprising the images 47 may be ignored when calculating the hash value. For example, the images may be broken down into groups of contiguous pixels (e.g., 5 contiguous pixels), and in each such pixel group, the brightness or surface normal information from only a single corresponding pixel may be used in generating the hash value.

The operations of the system are first described in general, and thereafter the operations relating to recovering surface normals are described in more detail.

Figure 4:
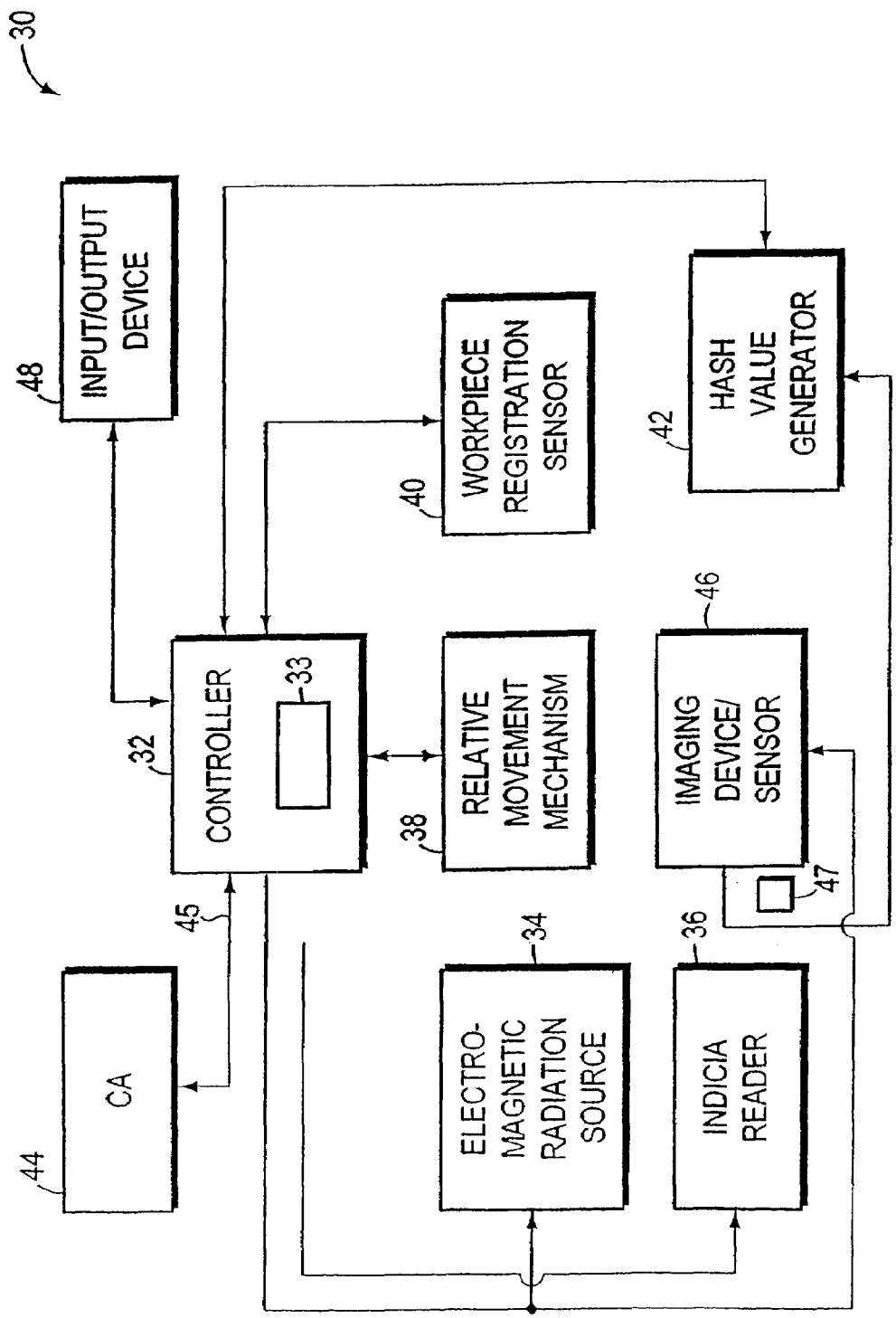
FIG. 4 is a functional block diagram illustrating the construction of one embodiment of an apparatus according to the second aspect of the present invention.

FIG. 4 is a functional block diagram of one embodiment of an apparatus 30 for generating and placing marks 7, 8 of indicium 10 on surface 11 of envelope workpiece 1. As shown in FIG. 4, apparatus 30 includes controller 32. Controller 32 includes computer-readable memory 33 (e.g., comprising random access, read-only, and/or mass storage memory) for storing software programs and associated data structures for execution by one or more processors also comprised in controller 32 and/or other elements of apparatus 30. When executed by the one or more processors in apparatus 30, the software programs and data structures cause the controller 32 and other elements of apparatus 30 to carry out and/or implement the techniques, functions, and operations described herein as being carried out and/or implemented by controller 32 and other elements of apparatus 30. It will be apparent to those skilled in the art that many types of computer processors and memories may be used in controller 32 without departing from the present invention. For example, controller 32 may comprise one or more Intel 80×86-type processors and associated memory.

User input/output device 48 comprises a conventional mechanism for interfacing a human user (not shown) to the controller 32 so as to permit the user to control and monitor operation of apparatus 30. Device 48 may include, for example, one or more conventional computer-user interface devices, such as pointing and keyboard input devices, and a display output device which together permit the human user to input commands to controller 32 to be performed by apparatus 30, and to receive from controller 32 an indication of the progress of apparatus 30 in executing the input commands.

Apparatus 30 also includes a mechanism 38 for receiving the workpiece 1, in the example, an envelope, and for moving the envelope 1, to position the envelope 1 relative to an electromagnetic radiation source 34 and imaging device 46 in such a way as to permit generation of images 47 by device 46. More specifically, mechanism 38 comprises conventional electromechanical components that permit the envelope 1 to be physically inserted into mechanism 38, and thereafter, as appropriate to be moved relative to source 34 and device 46.

After envelope 1 is physically inserted into mechanism 38, mechanism 38 signals controller 32 that envelope 1 has been received by mechanism 38. In response to this signal from mechanism 38, controller 32 activates registration sensor 40. The sensor 40 comprises conventional components for optically scanning the envelope surface 11 and for determining, based upon such optical scanning, the position and orientation of registration marks 9 relative to the source 34 and device 46. At periodic time intervals after its activation, sensor 40 provides to controller 32 information concerning the position and orientation of the marks 9 relative to the device 46 from which controller 32 may determine the registration of the portion 29 relative to the source 34.

The controller 32 may use the registration information to determine the positions of coordinate axes in the associated images 47 and/or to determine which pixels are to be sampled to extract information for the images. Alternatively, or in addition, the controller 32 may provide commands to mechanism 38 that cause mechanism 38 to move the envelope 1 relative to the source 34 and device 46 such that the source 34 and device 46 are brought into an initial predetermined, or standard, registration relative to the portion 30.

Referring now also to FIG. 5, with the workpiece in place, the controller 32 determines the position of the centroid of the radiation sensing element(s) of the device 46 relative to the centroid of the portion 29, based on the relative locations of the registration marks 9. Under the direction of the controller 32, a given source 34, which is in a predetermined position relative to the workpiece, emits an electromagnetic beam 50 of illuminating radiation at a predetermined orientation relative to the portion 29. The beam 50 strikes the portion 29, and is reflected by the surface, with the respective 3-D surface features directing a portion 52 of the radiation beam 50 at an angle that is normal (i.e., perpendicular) to portion 29. This portion 52 of the radiation beam 50 is received by the sensing element(s) of device 46, which generates from portion 52 an image 47 that includes corresponding patterns 27. Device 46 then digitizes the image and supplies the digitized image to hash value generator 41. The hash generator 41 stores the digitized image in a computer-readable memory (not shown), and indicates to controller 32 that it has received and stored the digitized image.

The controller 32 next causes the source 34 to illuminate the portion 29 such that the illumination beam 50 has a different angle and/or orientation relative to the portion 29. The device 46 receives a corresponding portion 52 of the beam that is reflected in the direction of the sensing elements by the 3-D surface features, and the device 46 converts this portion into another image 47 of the portion 29. The device 46 then digitizes the image, and provides the image to the hash value generator 41, which stores the digitized image and indicates to the controller 32 that it has received and stored the digitized image.

As appropriate, the controller 32 again causes the source 34 to illuminate the portion 29 so as to produce another image 47, which is then digitized and provided to the hash value generator 41, and so forth.

After the generator 41 has stored the one or more images 47, the generator recovers the surface normals, as discussed in more detail below, and generates an associated hash value, or string, using one of the previously described hash value generation algorithms. The hash value generated by generator 41 is then transmitted to the controller 32.

In the example in which the workpiece 1 is a postal mailpiece, the controller 32 next retrieves from the memory 33 a previously stored identification number that is used to identify the apparatus 30, and receives from the I/O device 48 an associated postage value for the mailpiece 1. The controller 32 then concatenates the hash value with the apparatus identification number and the associated postage value, in a predetermined fashion, so as to enable each of these values (i.e., the hash value, apparatus identification number, and postage value) to be extracted from the resultant concatenation when a predetermined extraction algorithm is applied thereto. Other values, (e.g., indicium version number, algorithm identification number, postal service device serial number, manufacturer identification number, apparatus model identification number, date of posting, ascending and descending register value, license post office zip code, apparatus software version identification number, destination delivery point code, and/or mail category/class code, may also be so concatenated with the hash value. The controller 32 then causes a printing mechanism 36 to print markings 8, which correspond to or represent the resultant concatenation of the apparatus identification number, postage value, and hash value.

Alternatively, the hash value, or string, once generated may be uploaded to the certifying authority 44 via network 45. The certifying authority 44 may then cryptographically sign or otherwise generate an information security signature for the string provided to it by the controller 32 of apparatus 30, and may return the signed string to the controller 32 via the network 45.

If the controller 32 and memory 33 of apparatus 30 are tamper-resistant, the cryptographic key used to sign the string may instead be stored in memory 33. The controller 32 then causes print mechanism 36 to print markings 8 that correspond to or represent the cryptographically signed concatenation and decrement a maximum postage value stored in the tamper-resistant memory.

The controller 32 may also cause printer 36 to place marks 7 onto the surface 11 of the mailpiece 1. The information represented by the one or more marks 7 may be supplied to the controller 32 by a human user via device 48 and/or may be prestored in memory 33 and retrieved therefrom by controller 32. The information comprised in the string may be transmitted to the CA for storage in a database for use in ensuring that the purchaser of postage is properly charged for the postage being used to post the mailpiece 1, and for other purposes that will be described below. Alternatively, or in addition thereto, the user of apparatus 30 may be required to log onto network 45 and to provide via network 45 information necessary to ensure identity of the user and the postage value prior to receiving the signed string from the CA to ensure proper charging of the postage to the user.

Figure 6:
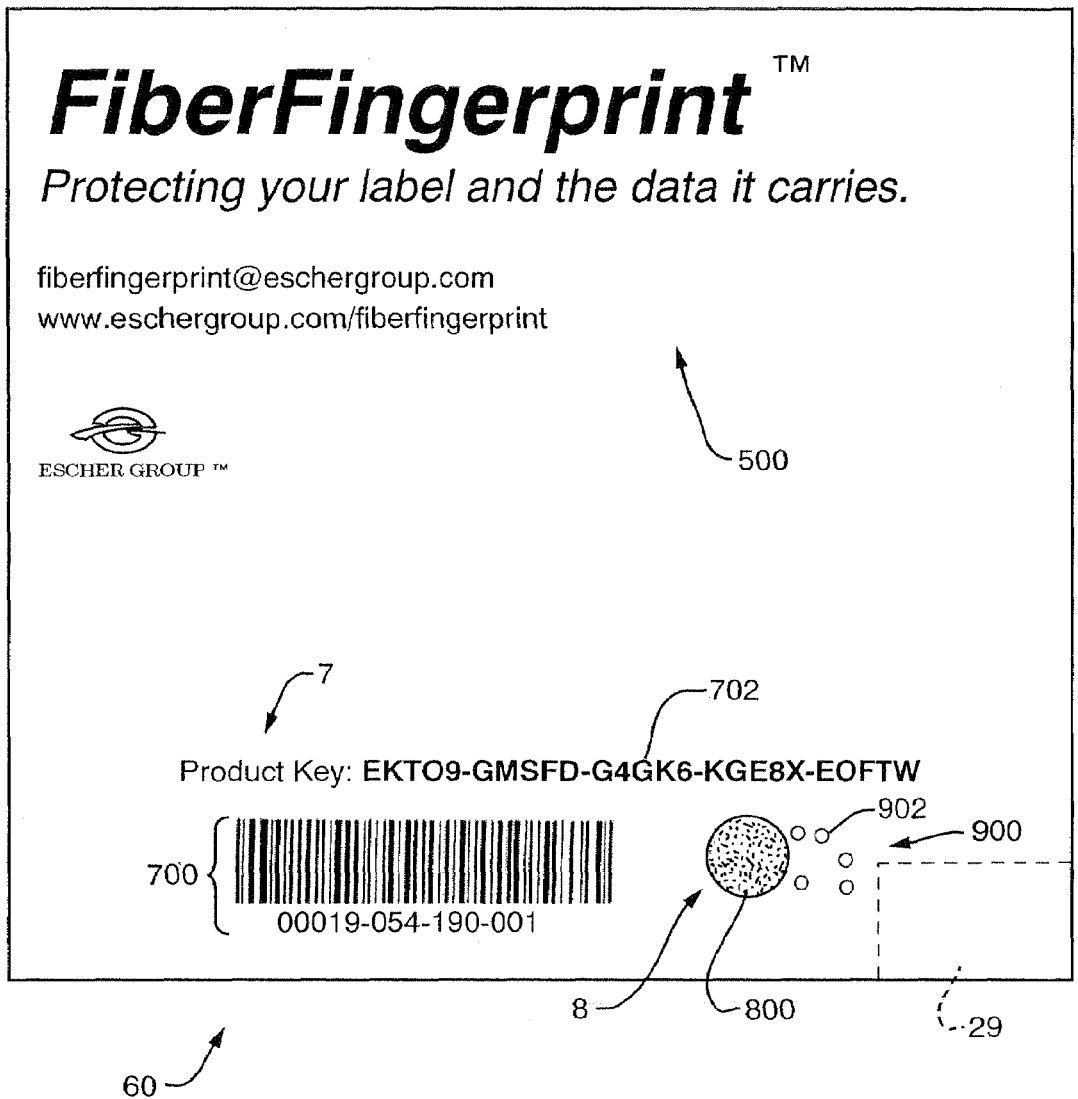
FIG. 6 is a schematic representation of a security label that includes a security seal.

Referring now to FIG. 6, a product or document security label 60 includes markings 8 that include a machine printable and readable security seal 800. The seal includes a string which is based, at least in part, on the images 47 that correspond to the portion 29. The string is recorded on the label using angular symbology, but may be recorded using other machine printable and/or readable techniques. For a further discussion of angular symbology refer to U.S. patent application Ser. No. 09/921,172 filed Aug. 2, 2001 entitled DATA ENCODING AND DECODING USING ANGULAR SYMBOLOGY, which is incorporated herein by reference. The markings 8 are based, at least in part, on images that are generated by illuminating a portion 29 of the label. The portion 29 may be, for example, a section of the lower right corner (denoted by dotted lines), of the label 60. A constellation 900 of dots 902, which is strategically positioned relative to the portion 29, denotes the location and orientation of the portion 29. The constellation 900, or the various dots 902 thereof, need not be printed adjacent to the portion 29, and may instead be distributed over the workpiece. For example, the constellation 900, or the various dots 902 thereof, could be on top of the portion 29. The dots must, however, have a known relationship to the portion.

Markings 7 consist of a product serial number that is represented by a barcode and an associated numerical sequence 700, and a product key 702, which is an alphanumeric sequence that is randomly assigned to the associated product by, for example, the manufacturer. As discussed in more detail below the serial number 700 and the product key 702 may be used to aid in authenticating the label. The label 60 further includes printing denoted by the numeral 600, which consists of general label and/or product information.

The seal 800 includes a string that represents the hash value produced by the hash value generator 42, after the imaging device has provided digitized images to the generator, as discussed above with reference to FIG. 4. The string is further based, at least in part, on the serial number and the product key, which is essentially an information security signature.

The label 60 provides two security features, namely, a serial number/product key pairing and the security seal 800 which includes a string that is based on optical characteristics of the label and may be further based on the serial number and product key. To check for authenticity, the string may be generated locally and compared to the string read and/or decoded from the seal, as described above. The user thus checks that the label has not been copied.

The serial number, product key and the string or at least the associated hash value may be stored in an authentication database, which could be consulted in order to verify that the label has not been simulated, on, for example, unauthorized equipment. While the serial number/product key pairing may be copied and reproduced on counterfeit labels, the seal 800 provides a layer of security that essentially cannot be copied.

To verify that the label 60 has not been simulated a user first produces the one or more images. The user then manipulates the one or more images and, as appropriate, the serial number and product key to generate a string. The user then compares the generated string with the string included in the authentication database. Even if a counterfeiter could reproduce an accurate seal for the counterfeit label, the counterfeiter could not reproduce the seal, i.e., the string, that corresponds to the optical characteristics that are unique to the valid label. Thus, the saved string for the valid label and the generated string for the counterfeit label would not correspond.

As stated previously, markings 8 may comprise uni- or multi-dimensional barcodes and/or one or more machine or human-readable sequences of digits and/or characters. Alternatively, or in addition thereto, markings 8 may comprise one or more spread-spectrum markings wherein information from which the string, cryptographic signature of the string, and/or constituent portions thereof may be obtained, is "hidden", and retrievable therefrom in accordance with the teachings of copending U.S. patent application Ser. No. 10/018,416, entitled "Data Encoding and Decoding" filed Dec. 14, 2001, and commonly owned with the subject application; the entirety of the disclosure of said copending application is incorporated into the subject application by reference. The markings may further represent machine printable and readable symbology, such as the angular symbology discussed above.

Registration marks 9 and 902 may be placed on the workpiece by the manufacturer (i.e., prior to processing of the workpiece 1 by apparatus 30), using a conventional non-variable printing process, such as, offset, flexography, or intaglio printing. Alternatively, if appropriately modified, apparatus 30 may be configured to print the registration marks 9 at a predetermined location (i.e., the location that comprises portion 29), using printing mechanism 36. That is, the apparatus 30 may generate the images 47 and may then print marks 9 so as to delimit the portion 29 of the workpiece 1 from which the images 47 were generated. Further, if the apparatus 30 is appropriately modified, the images 47 may be of features corresponding to a plurality of different portions of the workpiece 1, with each portion being in a predetermined location and/or orientation relative to the registration marks.

Depending upon the type of imaging device 46 used in apparatus 30, the device 46 may generate the images 47 by scanning the portion 29 in a direction from one predetermined registration dot (e.g., dot 22) to another dot (e.g., dot 24). Alternatively, if the device 46 comprises a linear array of photo-sensors or a single photosensing element, the device 46 may separately scan "strips" or contiguous two-dimensional regions of the portion 29 and may generate respective composite images from which the hash value may be generated. Also, the illumination strength (i.e., amplitude) of the beam 50 may be adjusted so as to be equal to an empirically-determined "optimal" illumination strength (i.e., an illumination strength that provides an image with a maximum contrast to noise ratio).

Figure 7:
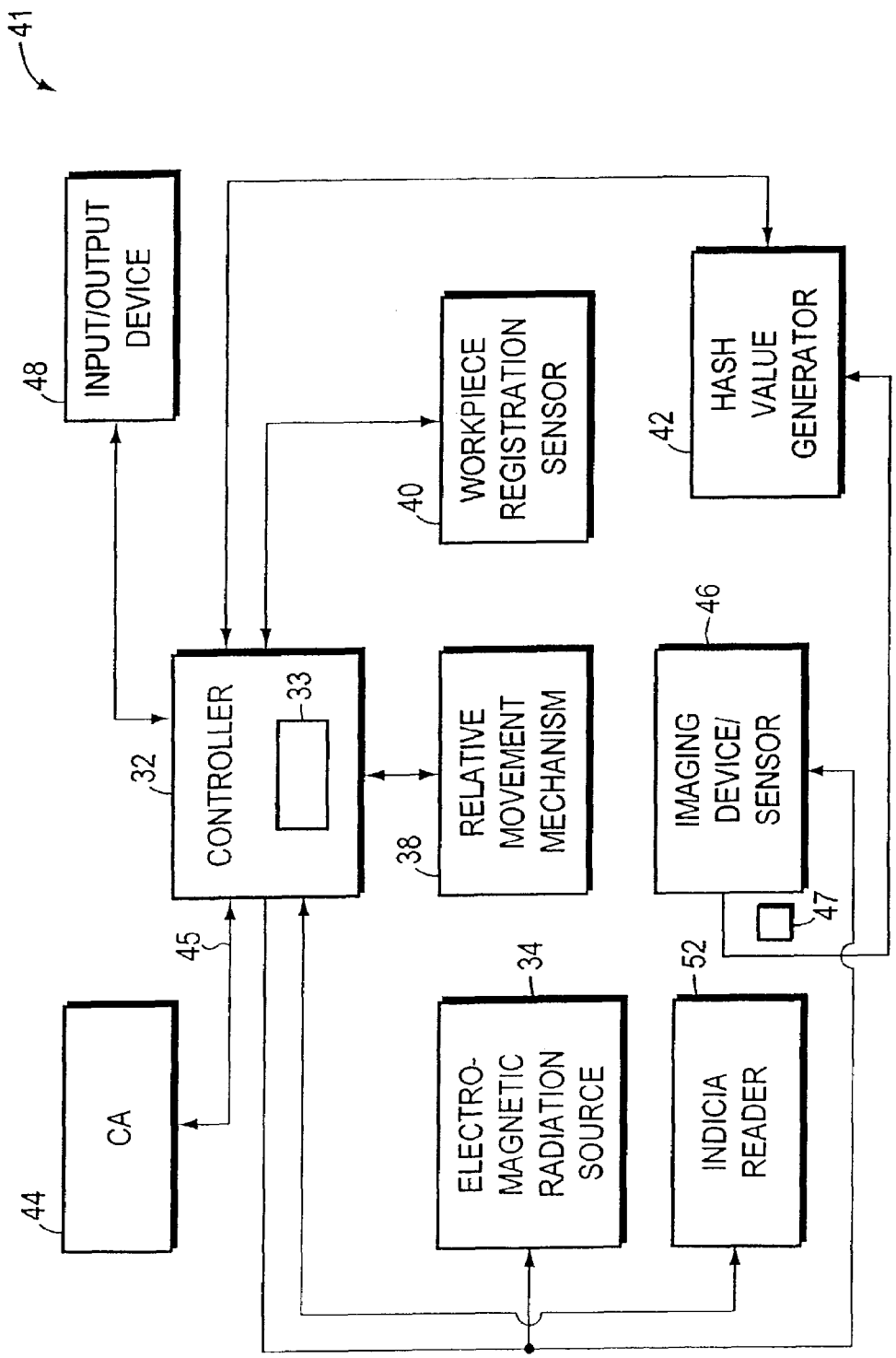
FIG. 7 is a functional block diagram of an apparatus for use in authenticating a workpiece.

FIG. 7 is a functional block diagram of an apparatus 41 for validating/authenticating a workpiece purporting to have an indicium according to the first aspect of the present invention. It should be understood that, unless specifically stated to the contrary, the components and operation of like-numbered elements of apparatus 30 and 41 are substantially identical. Apparatus 41 generates the hash value by illuminating and imaging the workpiece 1 in the same way as apparatus 30 and recovering the surface normals and, as appropriate, manipulating the surface normal information. Once generated by generator 41, the hash value is supplied to controller 32 of apparatus 41. The controller 32 then stores the hash value in the memory 33. The controller 32 then causes indicia reader 52 (e.g., comprising a conventional optical scanning system) to scan the marks 8 and to generate therefrom a digitized image of the marks 8. The reader 52 then supplies the digitized image to the controller 32. Using conventional optical character and/or barcode recognition techniques, and/or the spread-spectrum information retrieval techniques from the aforesaid commonly-owned provisional application and/or angular symbology retrieval techniques from the aforesaid commonly-owned patent application, the controller 32 generates from the digitized image the string and/or cryptographic encrypted or encoded signature of the string that corresponds to or is represented by the marks 8.

The controller 32 then extracts from the generated string the hash value, a postage value and/or apparatus or product identification numbers concatenated therein. The controller 32 next compares the extracted hash value with the hash value stored in the memory 33, if the two hash values match to within predetermined thresholds, as discussed below, the controller 32 provides via the device 48, an indication that the workpiece 1 should be considered valid. If the two hash values do not match, the controller 32 provides the opposite indication.

Alternatively, or in addition thereto, the controller 32 may obtain from a certifying authority 44 a cryptographic key that is expected to be able to verify the signature (i.e., the remaining cryptographic key of the public/private key pair that was used to generate the cryptographic signature). The controller 32 of apparatus 41 may then use the retrieved cryptographic key to verify and decrypt the signature to obtain the string. The controller 32 then parses to obtain the hash value that is contained therein. The generator 41 next compares the retrieved hash value with the hash value that is stored in the memory 33. If the two hash values match, the controller 32 provides to a human operator via device 48 an indication that the workpiece should be considered valid. If the two hash values do not match, however, an opposite indication is provided by the controller 32 to the human user via the device 48. The controller 32 also compares the other information contained in the string (i.e., the postage value and apparatus or product identification number) with corresponding information that is known to be valid. The corresponding information may, for example, be supplied to the controller 32 by the operator via the device 48.

The controller may also retrieve a code word from an authentication database and determine if the code word is contained in the signature and/or the hash. Alternatively, the controller may compare the hash value with a hash value stored in an authentication database.

For purposes of the hash value comparisons made by controller 32, each hash value may be viewed as a feature vector, and each such comparison may be carried out in the following manner. First, the feature vectors are normalized and the normalized vectors are compared by obtaining an inner product that measures the angle between the vectors in a high dimensional feature space. An inner product value near +1 may be defined to indicate that the vectors are highly correlated, and thus, that they were created from the same underlying 3-D features of the surface of the workpiece. An inner product below a set threshold may be defined to indicate the converse.

To overcome possible mis-registration, the two hash values may be compared taking into account possible offsets, and the highest resulting inner product correlation score may be used. Depending upon the device 46, the pixel brightness values of the digitized images from device 46 may consist of only positive values. This may cause these images to have large DC offsets, which may make this inner product comparison technique inaccurate. In order to improve the accuracy of this comparison technique, the zero spatial frequency component of the Fourier transforms (hereinafter termed "the DC offset") of the images used to generate the compared hash values should be eliminated. Beyond eliminating the DC component, high pass filtering of the images (or appropriately selecting particular frequency components thereof) generated by device 46 and thresholding the brightness value associated therewith based upon an empirically determined threshold value may help to improve the accuracy of this technique. Other hash value comparison techniques may alternatively be used by controller 32 of apparatus 41.

For example, depending upon the hash value algorithm employed, instead of comparing the two hash values, the hash value obtained from marks 8 may be parsed and decompressed to obtain images that may be compared directly with the filtered images 47 generated by the system 41 (i.e., for correlation therewith). Alternatively, and as discussed in more detail below, the system may predict what an image should contain based on the hash value, and compare a generated image with the prediction. Advantageously, the image comparison techniques may improve comparison consistency and accuracy.

The system uses shape recovery techniques to extract the 3-D features of the designated portion of the workpiece. In the embodiment described below, the system performs reflectance-based shape recovery to recover the surface normals for selected locations within the designated portion of the workpiece, and the normals or information based thereon is included in the hash value.

For ease of understanding the operations of the system are described below based on the use of a theoretically calculated "reflectance map," known as a Lambertian surface. A reflectance map, in general, is a function associated with a particular material that specifies how much incident light is scattered in a particular direction as a function of the surface normals.

Light impacting a Lambertian surface is scattered equally in all directions, and surfaces such as paper, Tyvek® (Tyvek is a registered trademark of Dupont), and many other materials with "matte" finish may, for example, be accurately modeled as Lambertian surfaces. With a Lambertian surface, parallel and constant illumination from a particular direction results in a pattern in which the brightness of a point on a surface of uniform albedo, i.e., a surface that absorbs light uniformly rather than selectively, depends on the relative orientation of the surface at the point. A surface patch that is perpendicular to the light source will be illuminated with, and therefore scatter, the maximum amount of light. A surface patch that is parallel to the light source will receive, and hence scatter, the least amount of light. Mathematically, the brightness is proportional to $E=E_0\rho \cos(\alpha)$ where $E_0$ is the incident illumination of the light source, $\rho$ is the albedo of the workpiece surface (assumed to be known and constant), and $\alpha$ is the angle between the illumination direction and the surface normal.

As discussed below, the system recovers the surface normals by collecting images that are produced under various illumination conditions and solving a linear system of equations that are based on the images. The more independent images collected, the less prior knowledge (or assumptions) are required. For example, the surface normals can be reconstructed using a single image and known lighting conditions, by making certain assumptions about the smoothness of the surface geometry and the albedo. As more images become available, it becomes possible to infer rather than assume the albedo, and/or the illumination and the camera geometry. Further, the albedo may actually be recovered such that the authentication process can reliably occur on surfaces with variable albedo, such as printed surfaces.

The workpiece is assumed to be at a known distance from the camera and the sources of illumination, where the distance is measured in the z direction. The workpiece may, however, be translated and rotated in the x-y plane, and the registration marks on the workpiece are used to determine the position and orientation of the workpiece relative to the camera and the sources of illumination. For purposes of the discussion below, the coordinate system is centered on the camera, with the x-y plane parallel to the image plane. The z axis coincides with the lens axis, the z origin is at the workpiece surface, and the coordinate system is right-handed.

Before discussing the operations of the system, the theory behind the operations is discussed.

There are two equivalent ways of representing the surface orientation of the workpiece in the context of the operations of the system, namely, gradient vectors and unit normal vectors, that is, normalized surface normals. Both are introduced below, as is a method of converting between the two.

For a surface defined as $z=f(x,y)$ the gradient of f is given by:

$$\nabla f = \hat{x}\frac{\partial z}{\partial x} + \hat{y}\frac{\partial z}{\partial y}$$

where $\hat{x}$ and $\hat{y}$ are unit vectors in the x and y directions, respectively. The gradient vector is a two-dimensional vector that points in the direction in the x-y plane in which f has maximum slope, with the magnitude of the gradient vector representing the magnitude of the slope.

The unit normal vector $\hat{n}$ is perpendicular to the surface and is constrained to a length of 1. Accordingly, the unit normal vector requires x, y and z components to convey the same information as the two-dimensional gradient vector, and each vector represents exactly two independent degrees of freedom. A small difference between the two representations is that surface normals can straightforwardly represent surface patches that are perpendicular to the x-y plane, while the gradient vectors take on infinite values in such cases.

With the components of the gradient defined as:

$$p = \frac{\partial z}{\partial x}$$
$$q = \frac{\partial z}{\partial y}$$

p is the slope in the x direction, y is the slope in the y direction, and $\nabla f = \hat{x}p + \hat{y}q$. A move of a small distance $\delta x$ in the $x$ direction causes a change $\delta z = p\delta x$ and a move of a small distance $\delta y$ in the y direction causes a change $\delta z = q\delta y$. Setting the steps to a distance of 1, respectively, it can be seen that a line parallel to the vector $(1,0,p)$ lies in the tangent plane at $(x,y)$ as does a line parallel to the vector $(0,1,q)$. The two lines are orthogonal and the normal is then the cross product of the two lines:

$$n=(-p,-q,1)$$

and the unit normal vector is $$\hat{n} = \frac{1}{\|n\|}(-p, -q, 1) = \frac{(-p, -q, 1)}{\sqrt{1+p^2+q^2}}.$$

To convert from the unit normal vector $\hat{n}=(\hat{n}_x,\hat{n}_y,\hat{n}_z)$ to the gradient is straightforward:

$$\hat{n}_z = \frac{1}{\|n\|}.$$

thus $\frac{\hat{n}}{\hat{n}_z} = \left(\frac{-\hat{n}_x}{\hat{n}_z}, \frac{-\hat{n}_y}{\hat{n}_z}; \frac{1}{\hat{n}_z}\right) = (-p, -q, 1)$ and $$\nabla f = \hat{x}\frac{-\hat{n}_x}{\hat{n}_z} + \hat{y}\frac{-\hat{n}_y}{\hat{n}_z}$$

A light source can be represented by a unit normal vector pointing towards the light. The normal is orthogonal to the surface patch which "faces," i.e., is orthogonal to the light source and thus:

$$\hat{s} = \frac{(-p_s, -q_s, 1)}{\sqrt{1+p_s^2+q_s^2}}$$

For an ideal Lambertian surface with albedo $\rho$ that is illuminated by single point source, scene radiance is given by $$R(p, q) = \frac{E_0 \rho}{\pi}\cos(\alpha)$$

where $\alpha$ is the incident angle, i.e., the angle between the surface normal and the direction toward the light source and $E_0$ is the irradiance from the source on a surface oriented perpendicular to the incident rays. The $\cos(\alpha)=\hat{n}\cdot\hat{s}$ where "·" denotes inner product and thus $$R(p, q) = \frac{E_0 \rho}{\pi} \frac{1+p_s p + q_s q}{\sqrt{1+p^2+q^2}\sqrt{1+p_s^2+q_s^2}}$$

for positive numerators, and otherwise $R(p, q)=0$. The constant factor of $\pi$ can be ignored, since the sensor values must be numerically scaled or normalized. Also, $E_0$ is assumed to be constant, and is omitted from the calculations discussed below for convenience.

Using several light sources, the unit normal vectors pointing toward the respective light sources are:

$$\hat{s}_i = \frac{(-p_i, -q_i, 1)}{\sqrt{1+p_i^2+q_i^2}}$$

for i=1, 2 . . .
and the scene radiances are $R_i=\rho(\hat{s}_i\cdot\hat{n})$

Let S be a matrix with rows that are the light source directions and R be a vector of scene radiance for the various light sources:

$$R=\rho S\hat{n}$$

or in matrix notation $$\begin{pmatrix} R_1 \\ R_2 \\ \vdots \\ R_i \end{pmatrix} = \rho \begin{pmatrix} S_{1x} & S_{1y} & S_{1z} \\ S_{2x} & S_{2y} & S_{2z} \\ \vdots & \vdots & \vdots \\ S_{ix} & S_{iy} & S_{iz} \end{pmatrix} \begin{pmatrix} \hat{n}_x \\ \hat{n}_y \\ \hat{n}_z \end{pmatrix}$$

and the albedo and normals are $$\rho\hat{n}=S^{-1}R.$$

The system can then solve for the surface normals using the information from the image, i.e., the brightness measurements, and the known locations of the light sources. As discussed, the light sources are here assumed to be point sources that are located far from the workpiece, and the illumination is thus uniform over and at respective designated angles to the surface. Accordingly, the inverse of the illumination matrix S can be precomputed.

If more than 3 light sources are used, the solution is overdetermined and a pseudo-inverse based on an algorithm for Singular Value Decomposition can be used (eg the pinv( ) function of Matlab; also see e.g. W. Press et al, *Numerical Recipes in C,* Cambridge University Press for a discussion of pseudo-inverses and Singular Value Decomposition).

For the special case of 3 light sources, the solution equation is equivalent to $$\rho\hat{n} = \frac{1}{[\hat{s}_1\hat{s}_2\hat{s}_3]}(R_1(\hat{s}_2\times\hat{s}_3) + R_2(\hat{s}_3\times\hat{s}_1) + R_3(\hat{s}_1\times\hat{s}_2))$$

where $[\hat{s}_1\hat{s}_2\hat{s}_3]$ denotes the triple product $\hat{s}_1\cdot(\hat{s}_2\times\hat{s}_3)$. (See B. K. P Horn, *Robot Vision*, MIT Press for further discussion of the special case.)

Once the components of the vector $\rho\hat{n}$ have been recovered, the value of $\rho$ is the magnitude:

$$\rho=\|\rho\hat{n}\|,$$

and the components of the unit normal $\hat{n}$ are found by normalization:

$$\hat{n} = \frac{\rho\hat{n}}{\|\rho\hat{n}\|}.$$

The recovered normals are in the camera centered coordinate system. Ideally, the recovered physical structure, that is, the surface normals or gradients, should be defined in the workpiece coordinate system, so that the recovered structure will be invariant to workpiece position and orientation shifts. The surface slopes, or gradients, are recovered along a particular direction defined with respect to the workpiece, in the discussion below the direction of interest is along the x axis of the workpiece. For some applications it may be desirable to extract the surface slope along two orthogonal directions, i.e., along the x and y axes, as these two slopes are independent degrees of freedom associated with the surface of interest.

The slope or rate of change of the workpiece surface $z=f(x,y)$ in the direction of the x axis is calculated as a directional derivative. Let $\hat{v}$ be a unit vector in a direction of interest, here in direction of the x-axis of the workpiece, as viewed from the camera's coordinate system. The directional derivative operator is defined as the inner product of the gradient operator with the unit direction vector:

$$\frac{d}{dv} \equiv \nabla_{\hat{v}} \equiv \hat{v} \cdot \nabla = v_x \frac{\partial}{\partial x} + v_y \frac{\partial}{\partial y}.$$

Thus, using a surface normal $\hat{n}$ that is recovered by the illumination method above and converted to the corresponding gradient and an orientation, or unit direction, vector $\hat{v}$, the slope of the surface f in the direction $\hat{v}$ is calculated as:

$$\frac{df}{dv} = \frac{-\hat{n}_x}{\hat{n}_z} v_x + \frac{-\hat{n}_y}{\hat{n}_z} v_y$$

Given a unit vector $\hat{u}$ in the direction of the y-axis of the workpiece as viewed from the camera coordinate system, the slope of the surface f in the direction of $\hat{u}$ is similarly calculated.

The assumption that the illumination sources are point light sources that are located far from the workpiece does not hold for readers that use LEDs as the illumination sources. While the LEDs may be approximated as point sources, the close spacing between the LEDs and the workpiece means that the illumination impinging on the workpiece does not consist of parallel rays. Accordingly, the direction to a given light source will depend on the x-y position being considered. Note that the illumination is fixed with respect to the camera and not the workpiece, and thus, the direction to the light source depends on the pixel under consideration. If the physical coordinates of the point on the workpiece corresponding to pixel I are $(I_x, I_y, 0)$ as defined in the camera coordinate system, the direction from the point $(I_x, I_y, 0)$ to a light source at physical location $s=(s_x, s_y, s_z)$ is $(s_x-I_x, s_y-I_y, s_z)$. The normalized source direction vector associated with pixel I is then $$\hat{s} = \frac{(s_x - I_x, s_y - I_y, s_z)}{\sqrt{(s_x - I_x)^2 + (s_x - I_x)^2 + s_z^2}}$$

Accordingly, the illumination matrix S depends on the pixel being considered, and a different matrix S must be inverted for each pixel under consideration.

The inverse matrices $S^{-1}$ may be pre-computed for each pixel. Alternatively, the inverse matrices may be pre-computed on a quantized basis, such as for every 10th pixel in both x and y directions, with the remaining inverse matrices calculated by bilinear interpolation from the pre-computed values that are associated with the closest pixels. Also, the number of precomputed inverse matrices may be reduced by making use of any available symmetries. For example, if 4 LEDs are used and are placed at the vertices of a square, the number of precomputed inverse matrices may be reduced by a factor of 4 by taking advantage of the available symmetry.

The assumption thus far is that the illumination strength is uniform across angles. With the LEDs, however, the brightness is not totally uniform and, in particular, the brightness falls off at high angles. Thus, the value of the incident illumination $E_0$ varies across pixels. The variations may be included in the calculations by varying $E_0$ in accordance with the manufacturers specifications. Alternatively, the variations of $E_0$ may be determined empirically, by collecting images of very smooth, uniform albedo surfaces, such that the only variation in pixel brightness is due to the incident illumination. The system may instead collect multiple images of surfaces with uniform albedo but non-uniform surface normals and average the illumination values to determine $E_0$. Given manufacturing variability in the hardware that mounts the LEDs, as well as in the LEDs themselves, it may be desirable to perform such a calibration procedure in order eliminate from the calculations the effect of illumination variations. The values of $E_0$ that are applicable to a given pixel are then included in the calculations.

The discussion so far has also assumed that the workpiece is in the same position and orientation with respect to the camera and sources of illumination for each of the differently illuminated images. Accordingly, the components of the surface normals are constant for all measurements. It is desirable to relax this assumption, however, since in practice the measurements will typically not be made simultaneously, i.e., at the same moment in time, and the workpiece may have moved between image captures. Furthermore, if this requirement is relaxed the system can determine the surface normals in situations where there is larger relative movement between the workpiece and the reader, such as during manufacturing process where a label is moving with respect to the imaging and printing apparatus or during verification, when a hand-held reader is moving with respect to the workpiece.

To accommodate the relative movement, the system uses the workpiece coordinate system from the beginning. The pixel measurements collected will then correspond to the inner product of an illumination vector $\hat{s}_i$ and the surface normal vector $\hat{n}$, which always has the same components in the workpiece coordinate system. The illumination vector must thus be specified in the workpiece coordinate system, rather than in the camera coordinate system, such that the normal components being solved for will also be in the workpiece coordinate system. The motion of the workpiece between images is compensated for by transforming the light source directions to values that at any given time are appropriate to the relative position and orientation of the workpiece.

Figure 8:
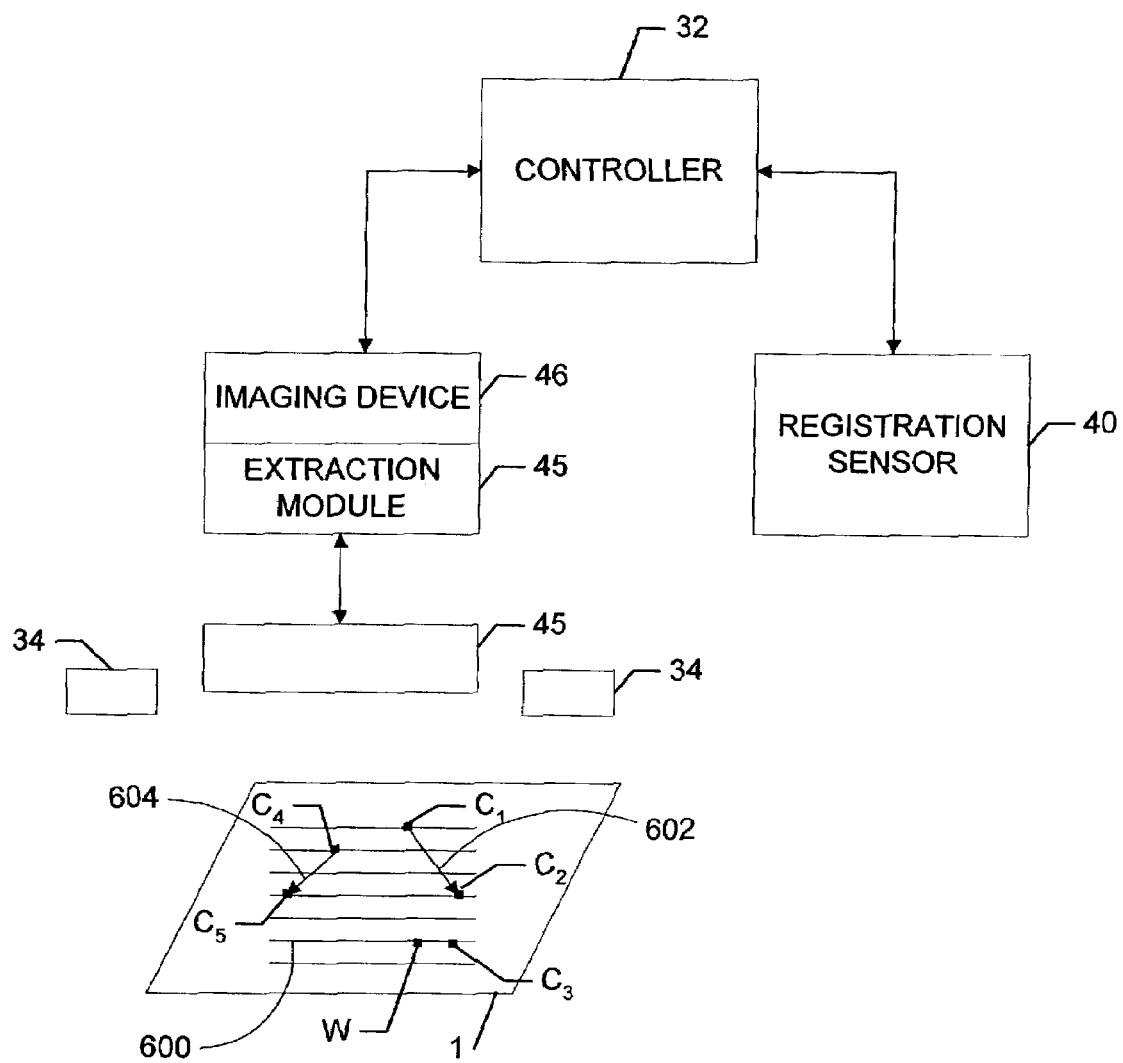
FIG. 8 is a functional block diagram illustrating positions of elements of the apparatus of FIG. 4 relative to the workpiece of FIG. 1 when the apparatus is in use.

Referring now also to FIG. 8 the system imaging device 46 includes an extraction module 45 that returns samples from the workpiece along a signal path 600, which consists of scan segments 602. The samples are taken uniformly across each scan segment, and the registration sensor 40 provides the pixel values from which the samples are collected. The pixel values depend on the relative configuration of the workpiece 1 and the camera 45, and thus, two or more pixel values associated with known workpiece coordinates effectively specify the relative configuration.

To specify the relative configuration, suppose (without loss of generality) that a vector 604 from registration constellation point $C_1$ to point $C_2$ is parallel to the x axis in the workpiece coordinate system, and a vector 606 from $C_4$ to $C_5$ is parallel to the y axis. The unit vectors in the x and y directions, $\hat{u}$ and $\hat{v}$, respectively, are given by $$\hat{u} = \frac{C_1 - C_2}{\|C_1 - C_2\|} \text{ and } \hat{v} = \frac{C_4 - C_5}{\|C_4 - C_5\|}.$$

If these vectors are specified in pixel coordinates, then û and v̂ will be representations of the workpiece axes in the camera coordinate frame. The coordinates of a point w on the workpiece whose normals the system is attempting to extract and a given light source 34 are also specified in the camera frame as w and s, respectively. The z coordinates of w, û, and v̂, which are on the workpiece, should be taken to be 0. A vector to the light source, from the point w, is given by (w−s). To find the x coordinate of the light source specified in the workpiece frame, the system takes the inner product of (w−s) with the workpiece x axis: (w−s)·û. Similarly, the y coordinate of the light source in the workpiece frame is given by (w−s)·v̂. The z coordinate is $s_z$. Thus, a non-normalized vector specified in the workpiece frame from point w to the illumination source is $$s' = <(w-s)\cdot\hat{u}, (w-s)\cdot\hat{v}, s_z>$$

and the corresponding unit vector can be found by normalization $$\hat{s}' = \frac{s'}{\|s'\|}.$$

To determine the correct scale, the system takes the pixel values for the constellation points 900, as specified by the registration sensor 40, and based on the known distance between the points on the workpiece, in, for example, millimeters, the system converts the pixel values to millimeters, while still in the camera coordinate system. The system next determines û and v̂ which are also in millimeters and in the camera coordinate system. Finally, the system determines the light source direction vector $s_i'$ for a given pixel w as $(w-s_i)\cdot\hat{u}, (w-s_i)\cdot\hat{v}, s_{i_z}$ and includes the corresponding unit vector $\hat{s}_i'$ in the work piece coordinates in further calculations.

Using this method, the illumination matrix S is constructed using the workpiece coordinates rather than the camera coordinates. The methods described above for finding the inverse or pseudo-inverse of the illumination matrix can then be used to recover the surface normals in the workpiece frame. This method is more complex, and so it may no longer be feasible to exhaustively pre-compute the $S^{-1}$, since the inverse matrix for each pixel and for each possible orientation of the paper would have to be pre-computed. As discussed above, symmetries may be used to reduce the memory requirements. Alternatively or in addition, the memory requirements may also be reduced by using a quantized table of inverse matrices, and interpolating between table entries.

The actual features used for determining the authenticity of the workpiece may be the full normal (both x and y components), or just one of the components. Filtering operations may be applied to the normal vectors just as they would to scalar brightness values. Indeed, the normal vectors may be quantized to eight bits, to one bit, or any other level of quantization, indicating the direction with varying degrees of precision, depending on the constraints of the particular application.

It may be possible to use the extracted normals directly as detection features, without filtering. Ideally, the normal directions should have a mean orientation perpendicular to the paper surface. However, given the likelihood of imperfections in the lighting and associated compensation methods described earlier, there could be remaining deviations from expected statistical behavior of the normals. One alternative is to perform a high pass filtering operation on the normal values to remove any residual biases due to imperfections in lighting, lighting compensation, or position compensation.

The system may instead record at enrollment a brightness pattern that is produced with, for example, all of the light sources on. During verification operations, the system collects images using the light sources separately and recovers the surface normals in the manner described above. The system then calculates what the brightness pattern should look like based on the enrollment geometry and thereafter compare the stored pattern and calculated pattern. The verification process should be robust, since differences in enrollment and verification geometries should not offset the results.

At enrollment other choices of geometry and illumination are also possible. If the geometry and illumination configuration is encoded in the indicia, or otherwise available to the verifier, then the verifier can determine the surface geometry and calculate the brightness pattern associated with the enrollment geometry and illumination configuration.

Alternatively, in an online or "networked" verification situation as one would find at an Automatic Teller Machine (cash machine), the surface normals of a substrate on an ATM card can be stored in a central database. Then the central system can issue a "challenge," consisting of an illumination configuration (eg it can command the verifier to provide illumination from one or more particular directions). The remote terminal can then respond with the brightness pattern (and optionally geometrical information about the position of the workpiece with respect to the camera). Using its full pre-recorded knowledge of the normals, the central system can then compute the expected appearance corresponding to the known surface normals and requested illumination. Since each challenge-response pair can be randomly selected and thus different virtually every time, an eavesdropper listening in to the authentication session (but who does not in fact posses the genuine card) cannot record the session and then "spoof" the central system into appearing to posses the genuine card.

If the system operations are based on assumptions that do not take all of the geometric information into account, for example, the assumption that the surface is uniformly illuminated by point sources, the system may take into account the relative position and orientation of the workpiece when making a determination that a workpiece is counterfeit.

More specifically, the simplified system determines authenticity based on an "error score" that represents the correlation between, for example, the surface normals calculated during enrollment (or the brightness image collected during enrollment) and the surface normals calculated during verification (or the brightness image collected during verification). The error scores for a genuine workpiece will change as the workpiece shifts with respect to the illumination sources and camera. For example, error scores are larger when the designated portion of the workpiece is in a position that differs greatly from the enrollment position. The error scores will, with a very high probability, improve for a given authentic workpiece as the position and orientation of the workpiece shift closer to the enrollment position. The error scores for a counterfeit workpiece, however, should not improve with shifts in the position and orientation of the workpiece. Thus, the system determines that a workpiece is authentic if a relatively low error score is calculated. If, however, a relatively high error score is calculated, the system further verifies the authentication information by ensuring that before the genuine/counterfeit decision is made the workpiece is positioned within predetermined range of a "standard" position used for the enrollment operations.

Figure 9A:
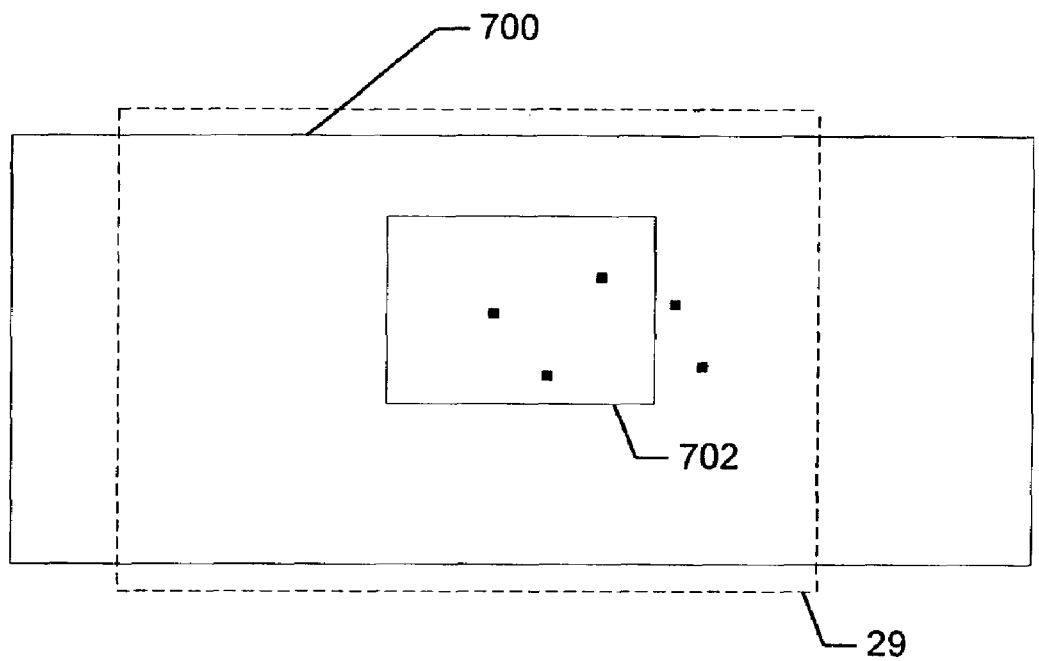
FIGS. 9A-9C are schematic representations of a workpiece and camera view field.
Figure 9B:
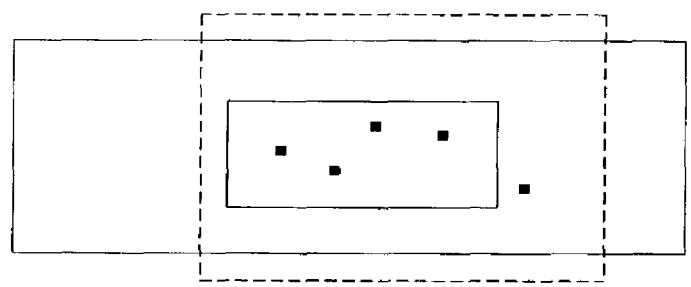
Figure 9C:
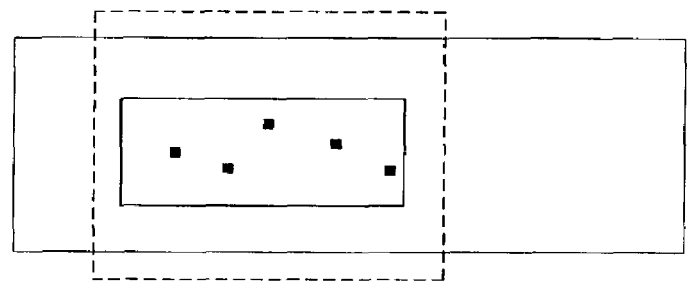

Referring now to FIGS. 9A-9C, the enrollment position is depicted in FIG. 9C, which has the workpiece positioned and oriented such that the constellation 900 of registration dots is in a particular position within a center section (referenced in the drawing as box 702) of the camera view (referenced in the drawing as box 700). The simplified system may produce an error score that exceeds the threshold for authenticity when the workpiece is in the relative position depicted in FIG. 9A. Accordingly, before determining that the workpiece is counterfeit the system recalculates the error score when the workpiece is in a relative position that is closer to the enrollment geometry, that is, in a position and orientation that are within a predetermined range of the enrollment geometry, such as when the workpiece is in the relative position depicted in FIG. 9B. If the error score remains above the authentication threshold when the workpiece is within the predetermined range of the enrollment geometry, the system then declares the workpiece counterfeit.

As discussed, the system and methods described above may be used to identify workpieces based on the string associated with the recovered shapes of the 3-D features. The system may, for example, produce a string for a given workpiece and determine if the string corresponds to one of the strings stored in a data base.

We have depicted that system as including a plurality of processors, such as the controller 32 and the imaging device 46. The processors may be combined into a single processor or arranged as various other groupings of processors. The instructions for the operations that the processors perform may be stored on memory resident on the respective processors, or on memory that is resident on certain of the processors and shared with or made available to other processors. Alternatively, the instructions for one or more of the operations may be made available to or communicated to the processors by, for example, the controller. Further, the system may store, transmit, print or otherwise provide the image to a user for decoding and/or authentication. Similarly, the image may be transmitted to or provided in hardcopy to be scanned into the system for decoding and/or authentication.

The system is readily implemented by means of one or more digital processors, either general purpose or special purpose. Conventional signal processing software and algorithms are readily applied to perform the requisite processing described herein.

What is claimed is:

1. Apparatus for use in generating a string for use in determining whether a workpiece is valid, comprising:
   an electromagnetic radiation source for illuminating at least one portion of the workpiece with electromagnetic radiation from one or more illumination positions relative to said at least one portion;
   an imaging device for generating one or more images of optical characteristics of the at least one portion when the at least one portion is illuminated with the radiation by the source from respective illumination positions; and
   a string generator that generates the string based upon, at least in part, recovered shapes of 3-D features of the illuminated surface of the at least one portion, the generator recovering the shapes from the one or more images.

2. The apparatus according to claim 1 wherein the string generator recovers the shapes as surface normals or gradients.

3. Apparatus according to claim 2, wherein the one or more illumination positions include one or more orientations relative to the at least one portion of the workpiece.

4. Apparatus according to claim 2, wherein a portion of the radiation is reflected from the at least one portion at an angle that is normal to a surface of the at least one portion, and the one or more images are generated from said portion of the radiation.

5. Apparatus according to claim 1, further comprising a mechanism that marks the workpiece with a set of one or more markings corresponding to at least one of a signature, the string, and an encrypted representation of the string, the signature being based upon the string and an encrypted representation of the string and a cryptographic key of a certifying authority (CA) or an assigned codeword.

6. Apparatus according to claim 5, wherein said one or more markings comprise at least one of the following on said workpiece: a barcode, a sequence of numeric or alphanumeric characters, a spread-spectrum marking, and angular symbology.

7. Apparatus according to claim 5, wherein said workpiece comprises a postal mailpiece, a security label, a certificate of authentication, a credit/debit card, an identity card, and a product.

8. Apparatus according to claim 5, wherein said workpiece comprises a postal mailpiece, and said string is also representative of a postage value associated with said mailpiece, if said workpiece is valid.

9. Apparatus according to claim 8, wherein said one or more markings are imprinted on said mailpiece, and said string is also identifies the apparatus, if said workpiece is valid.

10. Apparatus according to claim 9, wherein said string is based upon respective numerical values representative of: one or more hash values representative of said appearance, said postage value, and an identification value identifying said apparatus.

11. Apparatus according to claim 1, wherein the at least one portion comprises a plurality of portions of the workpiece.

12. Apparatus according to claim 1, wherein said string is based upon, at least in part, a concatenation of a plurality of numerical hash values derived from said one or more images.

13. Apparatus according to claim 1, wherein the string is based upon, at least in part, a numerical hash value derived from surface normals values that correspond to one or more images, the hash value being generated by a process that includes extracting from the one or more images one or more image portions, scaling the image portions to generate scaled image portions, determining surface normals values for selected pixels, averaging the surface normal values to generate filtered surface normal values, and subtracting the filtered surface normal values for corresponding pixels.

14. Apparatus according to claim 1, wherein the string uniquely identifies the workpiece.

15. Apparatus of claim 1 wherein the workpiece is a security label or certificate of authenticity that is associated within a given product or document and the string is further based, at least in part, on information that identifies the given product or document.

16. Apparatus according to claim 1, wherein the string is based upon, at least in part, a numerical hash value derived from one or more images, the value being generated by a process that includes determining surface normal values for workpiece locations that correspond to pixels in the one or more images, and filtering the surface normal values to produce filtered values.

17. Apparatus according to claim 16, wherein the process further includes scaling the surface normal values before the values are filtered.

18. Method for generating a string for use in determining whether a workpiece is valid, comprising:
   illuminating at least one portion of the workpiece with electromagnetic radiation from one or more illumination positions relative to the at least one portion;
   generating one or more images of optical characteristics of 3-D features of a surface of the at least one portion when the at least one portion is illuminated with the radiation at the one or more illumination positions;
   recovering the shapes of one or more of the 3-D features from the one or more images; and
   generating the string based upon, at least in part, the recovered one or more shapes.

19. Method according to claim 18 wherein the step of recovering the one or more shapes includes recovering surface normals or gradients.

20. Method according to claim 19 wherein the step of recovering the one or more shapes further includes recovering the surface normals or gradients based on directional derivatives along one or more coordinate axes in the workpiece coordinate frame.

21. Method according to claim 20 wherein the step of recovering the surface normals includes determining in the workpiece coordinate frame illumination direction vectors that correspond to the illumination positions.

22. Method according to claim 18, further comprising marking the workpiece with a set of one or more markings corresponding to at least one of a signature, the string, and an encrypted representation of the string, the signature being based upon the string and a cryptographic key of a certifying authority or an assigned codeword.

23. Method according to claim 22, wherein said workpiece comprises a postal mailpiece, a security label, a certificate of authentication, a credit/debit card, an identity card, and a product that includes the optically active medium as a coating or layer.

24. Method according to claim 22, wherein said workpiece comprises a postal mailpiece, and said string is also representative of a postage value associated with said mailpiece, if said workpiece is valid.

25. Method according to claim 24, wherein said one or more markings are imprinted on said mailpiece by an apparatus, and said string also identifies the apparatus, if said workpiece is valid.

26. Method according to claim 25, wherein said string is based upon respective numerical values representative of: one or more hash values representative of said appearance, said postage value, and an identification value identifying said apparatus.

27. Method according to claim 18, wherein the one or more illumination positions include one or more orientations relative to the at least one portion of the workpiece.

28. Method according to claim 27, wherein the at least one portion comprises a plurality of portions of the workpiece.

29. Method according to claim 18, wherein a portion of the radiation is reflected from the surfaces of the 3-D features of the at least one portion at respective angles that are normal to the surface, and the one or more images are generated from said portion of the radiation.

30. Method according to claim 18, wherein said string is based upon, at least in part, a concatenation of a plurality of numerical hash values derived from said one or more images.

31. Method according to claim 18, wherein the sting is based upon, at least in part, a numerical hash value derived from surface normals values that correspond to one or more images, the hash value being generated by a process that includes extracting from the one or more images one or more image portions, scaling the image portions to generate scaled image portions, determining surface normals values for selected pixels, averaging the surface normal values to generate filtered surface normal values, and subtracting the filtered surface normal values for corresponding pixels.

32. Method according to claim 18, wherein the string uniquely identifies the workpiece.

33. The method of claim 18 wherein the workpiece is a security label or certificate of authenticity that is associated within a given product or document and the string is further based, at least in part, on information that identifies the given product or document.

34. Method according to claim 18, wherein the string is based upon, at least in part, a numerical hash value derived from one or more images, the value being generated by a process that includes determining surface normal values for workpiece locations that correspond to pixels in the one or more images, and filtering the surface normal values to produce filtered values.

35. Method according to claim 34, wherein the process further includes scaling the surface normal values before the values are filtered.

36. Computer-readable memory comprising computer-executable program instructions for use in generating a string for use in determining whether a workpiece is valid, the instructions when executed causing:
   illumination of at least one portion of the workpiece with electromagnetic radiation from one or more illumination positions relative to said at least one portion;
   generation of one or more images of optical characteristics of 3-D features of a surface of the at least one portion when the at least one portion is illuminated with the radiation at the one or more illumination positions;
   recovery of the shapes of one or more of the 3-D features from the one or more images; and
   generation of the string based upon, at least in part, the one or more shapes recovered from the one or more images.

37. Memory according to claim 36, wherein the instructions when executed also cause marking of the workpiece with a set of one or more markings corresponding to at least one of a signature, the string, and an encrypted representation of the string, the signature being based upon the string and a cryptographic key of a certifying authority or an assigned codeword.

38. Memory according to claim 37, wherein said one or more markings comprise at least one of the following on said workpiece: a barcode, a sequence of numeric or alphanumeric characters, a spread-spectrum marking, and angular symbology.

39. Memory according to claim 37, wherein said workpiece comprises a postal mailpiece, and said string is also representative of a postage value associated with said mailpiece, if said workpiece is valid.

40. Memory according to claim 39, wherein said one or more markings are imprinted on said mailpiece by an apparatus, and said string also identifies the apparatus, if said workpiece is valid.

41. Memory according to claim 40, wherein said string is based upon respective numerical values representative of: one or more hash values representative of said appearance, said postage value, and an identification value identifying said apparatus.

42. Memory according to claim 36 wherein the recovery of the one or more shapes includes the recovery of surface normals or gradients.

43. Memory according to claim 36, wherein said workpiece comprises a postal mailpiece, a security label, a certificate of authentication, a credit/debit card, an identity card, and a product.

44. Memory according to claim 36, wherein the one or more illumination positions are one or more orientations relative to the at least one portion of the workpiece.

45. Memory according to claim 36, wherein a portion of the radiation is reflected from the respective 3-D features of the surface of the at least one portion angles that are normal to the features and the one or more images are generated from said portion of the radiation.

46. Memory according to claim 36, wherein the at least one portion comprises a plurality of portions of the workpiece.

47. Memory according to claim 36, wherein said string is based upon, at least in part, a concatenation of a plurality of numerical hash values derived from said images.

48. Memory according to claim 36, wherein said string is based upon, at least in part, differences between the images.

49. Memory according to claim 36, wherein the sting is based upon, at least in part, a numerical hash value derived from surface normals values that correspond to one or more images, the hash value being generated by a process that includes extracting from the one or more images one or more image portions, scaling the image portions to generate scaled image portions, determining surface normals values for selected pixels, averaging the surface normal values to generate filtered surface normal values, and subtracting the filtered surface normal values for corresponding pixels.

50. Memory according to claim 36, wherein the string uniquely identifies the workpiece.

51. The memory of claim 36 wherein the workpiece is a security label or certificate of authenticity that is associated within a given product or document and the string is further based, at least in part, on information that identifies the given product or document.

52. Memory according to claim 36, wherein the string is based upon, at least in part, a numerical hash value derived from one or more images, the value being generated by a process that includes determining surface normal values for workpiece locations that correspond to pixels in the one or more images, and filtering the surface normal values to produce filtered values.

53. Memory according to claim 52, wherein the process further includes scaling the surface normal values before the values are filtered.

54. A method for authenticating a workpiece
illuminating at least one portion of the workpiece from a plurality of illumination positions;
producing one or more images of the optical characteristics of 3-D features of the surface of the at least one portion;
recovering from the one or more images the respective shapes of one or more of the 3-D features;
generating a string based upon, at least in part, the shapes recovered from the one or more images; and
determining if the string corresponds to a previously generated string that is associated with the workpiece.

55. A method for authenticating a workpiece
illuminating at least one portion of the workpiece from a plurality of illumination positions and producing one or more image of the optical characteristics of 3-D features of the surface of the at least one portion;
recovering from the one or more images the respective shapes of one or more of the 3-D features;
predicting an image produced under a different illumination condition based on the recovered shapes;
determining that the workpiece is authentic if the predicted image corresponds to an image produced during workpiece enrollment using the different illumination condition.

56. Method for generating a string for use in determining whether a workpiece is valid
illuminating at least one portion of the workpiece with electromagnetic radiation from a plurality of illumination positions relative to said at least one portion;
generating one or more images of optical characteristics of 3-D features of the at least one portion when the at least one portion is illuminated with the radiation at the respective illumination positions;
recovering from the one or more images surface normals or gradients that correspond to selected ones of the 3-D features; and
generating a string based upon, at least in part, the surface normals and information that identifies one or both of the workpiece and an associated product or document.

57. Method according to claim 56 further including a step of authenticating the workpiece, the step including
predicting an image that corresponds to a given illumination condition based on the surface normals or gradients,
illuminating at least one portion of the workpiece in accordance with the given illumination condition to produce an authentication image; and
determining that the workpiece is authentic if the predicted image corresponds to the authentication image.

58. Method for authenticating a workpiece
illuminating at least one portion of the workpiece with electromagnetic radiation from a plurality of illumination positions relative to said at least one portion;
generating one or more images of optical characteristics of 3-D features of the at least one portion when the at least one portion is illuminated with the radiation at the respective illumination positions;
recovering from the one or more images surface normals or gradients that correspond to selected ones of the 3-D features;
generating a string based upon, at least in part, the surface normals and information that identifies one or both of the workpiece and an associated product or document; and
determining that the workpiece is authentic if the generated string corresponds to a string associated with the workpiece.

59. Method according to claim 58 further including the step of repeating the steps of generating the string and comparing the string to the string associated with the workpiece when the one or more images are made with the workpiece being in a predetermined relative position when the workpiece has not been determined to be authentic.

60. Method for authenticating a workpiece illuminating at least one portion of the workpiece with electromagnetic radiation from a plurality of illumination positions relative to said at least one portion;

generating one or more images of optical characteristics of 3-D features of the at least one portion when the at least one portion is illuminated with the radiation at the respective illumination positions;

recovering from the one or more images surface normals or gradients that correspond to selected ones of the 3-D features;

predicting an image that corresponds to a predetermined illumination condition based on the recovered surface normals or gradients; and determining if the predicted image corresponds to an image associated with the workpiece.

61. Method for identifying a workpiece illuminating at least one portion of the workpiece with electromagnetic radiation from a plurality of illumination positions relative to said at least one portion;

generating one or more images of optical characteristics of 3-D features of the at least one portion when the at least one portion is illuminated with the radiation at the respective illumination positions;

recovering from the one or more images surface normals or gradients that correspond to selected ones of the 3-D features;

generating a string based upon, at least in part, the surface normals; and identifying the workpiece based on a correspondence between the generated string and a stored string that is associated with the workpiece.

62. Method for authenticating a workpiece illuminating at least one portion of the workpiece with electromagnetic radiation from a plurality of illumination positions relative to said at least one portion;

generating one or more images of optical characteristics of 3-D features of the at least one portion when the at least one portion is illuminated with the radiation at the respective illumination positions;

recovering from the one or more images surface normals or gradients that correspond to selected ones of the 3-D features;

generating a string based upon, at least in part, the surface normals and information that identifies one or both of the workpiece and an associated product or document;

determining that the workpiece is authentic if the generated string corresponds to a string associated with the workpiece;

if the generated string does not correspond to the string associated with the workpiece determining if the workpiece is within a predetermined range of position and orientation to an enrollment orientation associated with the workpiece;

if the workpiece is not generating a new string with the workpiece is within the predetermined range and if the new string corresponds to the string associated with the workpiece determining that the workpiece is authentic; and if the generated string and the string associated with the workpiece do not correspond when the workpiece is within the predetermined range, determining that the workpiece is counterfeit.

* * * * *